United States Patent
Nyu

(10) Patent No.: US 6,633,577 B1
(45) Date of Patent: Oct. 14, 2003

(54) HANDSHAKING CIRCUIT FOR RESOLVING CONTENTION ON A TRANSMISSION MEDIUM REGARDLESS OF ITS LENGTH

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/419,903

(22) Filed: Oct. 18, 1999

Related U.S. Application Data

(63) Continuation-in-part of application No. 09/047,330, filed on Mar. 25, 1998, now abandoned.

(30) Foreign Application Priority Data

Mar. 26, 1997 (JP) .............................................. 9-073187

(51) Int. Cl.⁷ .......................... H04L 12/28; H04L 12/56
(52) U.S. Cl. ...................................... 370/416; 370/447
(58) Field of Search ................................ 370/412, 415, 370/416, 417, 514, 445, 447, 448, 462

(56) References Cited

U.S. PATENT DOCUMENTS

| | | | |
|---|---|---|---|
| 4,430,651 A | | 2/1984 | Bryant et al. |
| 4,547,850 A | * | 10/1985 | Genma ........................ 709/253 |
| 4,598,285 A | * | 7/1986 | Hoshen .................... 340/825.5 |
| 4,707,829 A | * | 11/1987 | Pendse ........................ 370/445 |
| 5,293,375 A | * | 3/1994 | Moorwood et al. ......... 370/445 |
| 5,566,171 A | * | 10/1996 | Levinson .................... 370/352 |
| 5,940,399 A | * | 8/1999 | Weizman .................... 370/445 |

FOREIGN PATENT DOCUMENTS

| | | |
|---|---|---|
| DE | 43 31 038 A | 3/1995 |
| DE | 43 31 038 | 3/1995 |
| JP | 61-118044 | 6/1986 |
| JP | 08-507623 | 8/1996 |

OTHER PUBLICATIONS

Hagglund et al., Communication Method For Packet Switching Systems, Aug. 15, 2002, U. S. patent application Publication, p. 2, and figures 3, 4, 6, 8.*
IEEE Standard for a High Performance Serial Bus, *IEEE Std. 1394–1995*, pp. 100–102.
Merakos L et al., "Interconnection of CSMA/CD LANs via an N–port bridge" INFOCOM '89. Proceedings of the Eighth Annual Joint Conference of the IEEE Computer and Communications Societies. Technology: Emerging or Converging, pp. 28–37, Apr. 1989.

* cited by examiner

*Primary Examiner*—Wellington Chin
*Assistant Examiner*—Jamal A. Fox
(74) *Attorney, Agent, or Firm*—Sughrue Mion, PLLC

(57) ABSTRACT

For establishing a parent-child relationship between adjacent network nodes interconnected by a transmission medium, a handshaking circuit comprises a state detector for monitoring the transmission medium to detect predetermined first and second states and a contention that occurs when the predetermined first states are simultaneously present. A state machine asserts the first state for initiating a handshaking process and relinquishes this state when a contention is detected. A receive count value is continuously incremented from the instant the contention is detected to the instant the transmission medium changes to an idle state. A transmit count value is continuously incremented from the instant the first state is detected to the instant the contention is detected. When the transmit count value is greater than the receive count value, the state machine asserts the first state again and when the transmit count value is smaller than the receive count value, it asserts the second state.

19 Claims, 14 Drawing Sheets

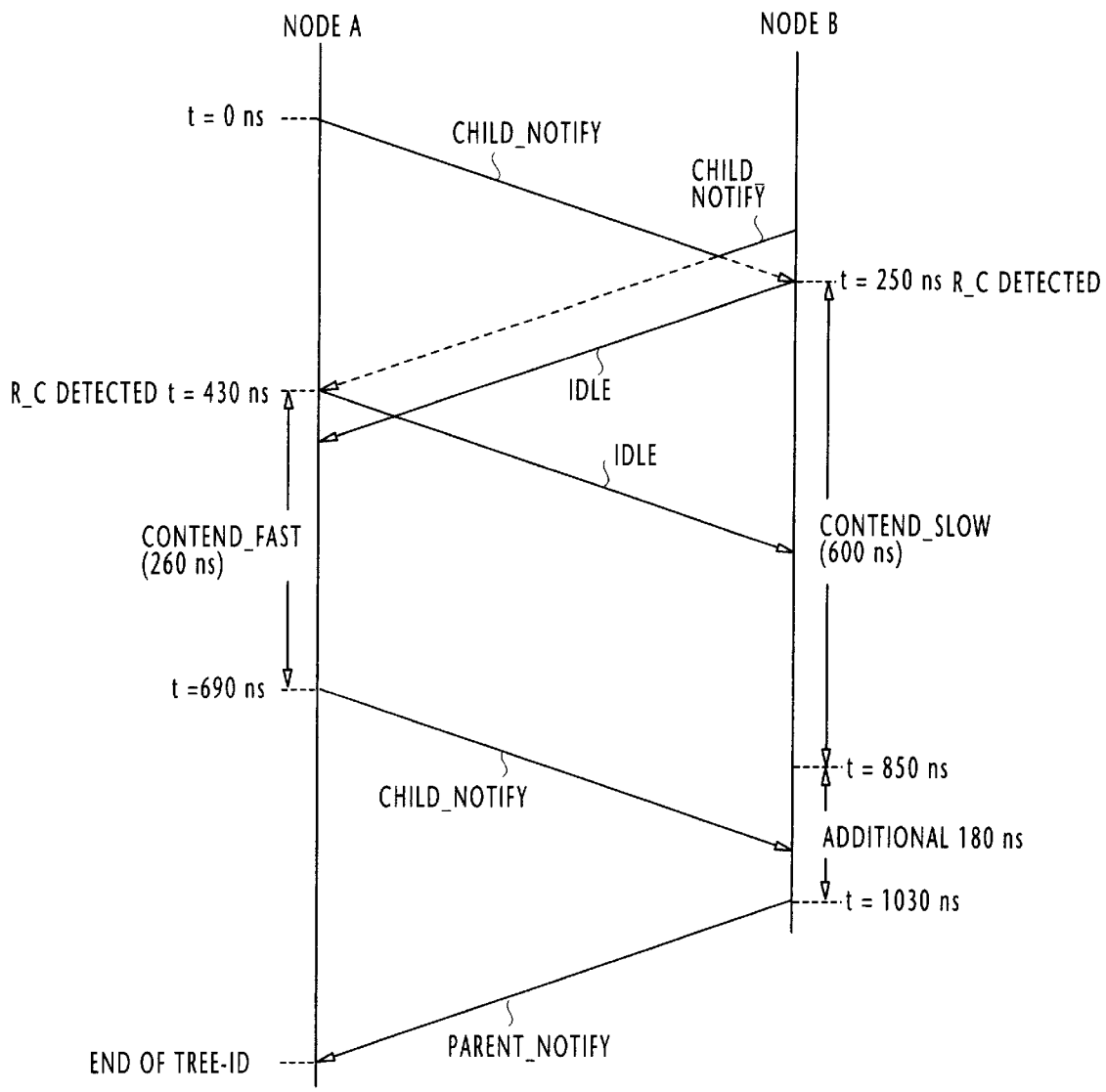

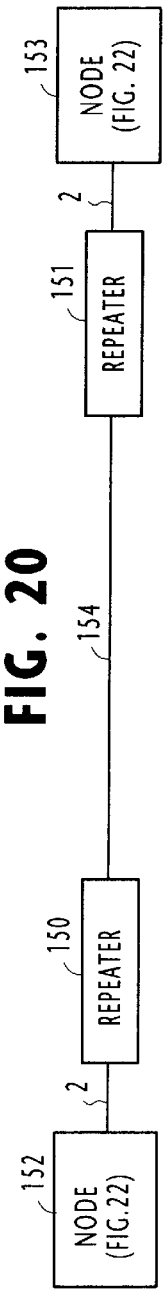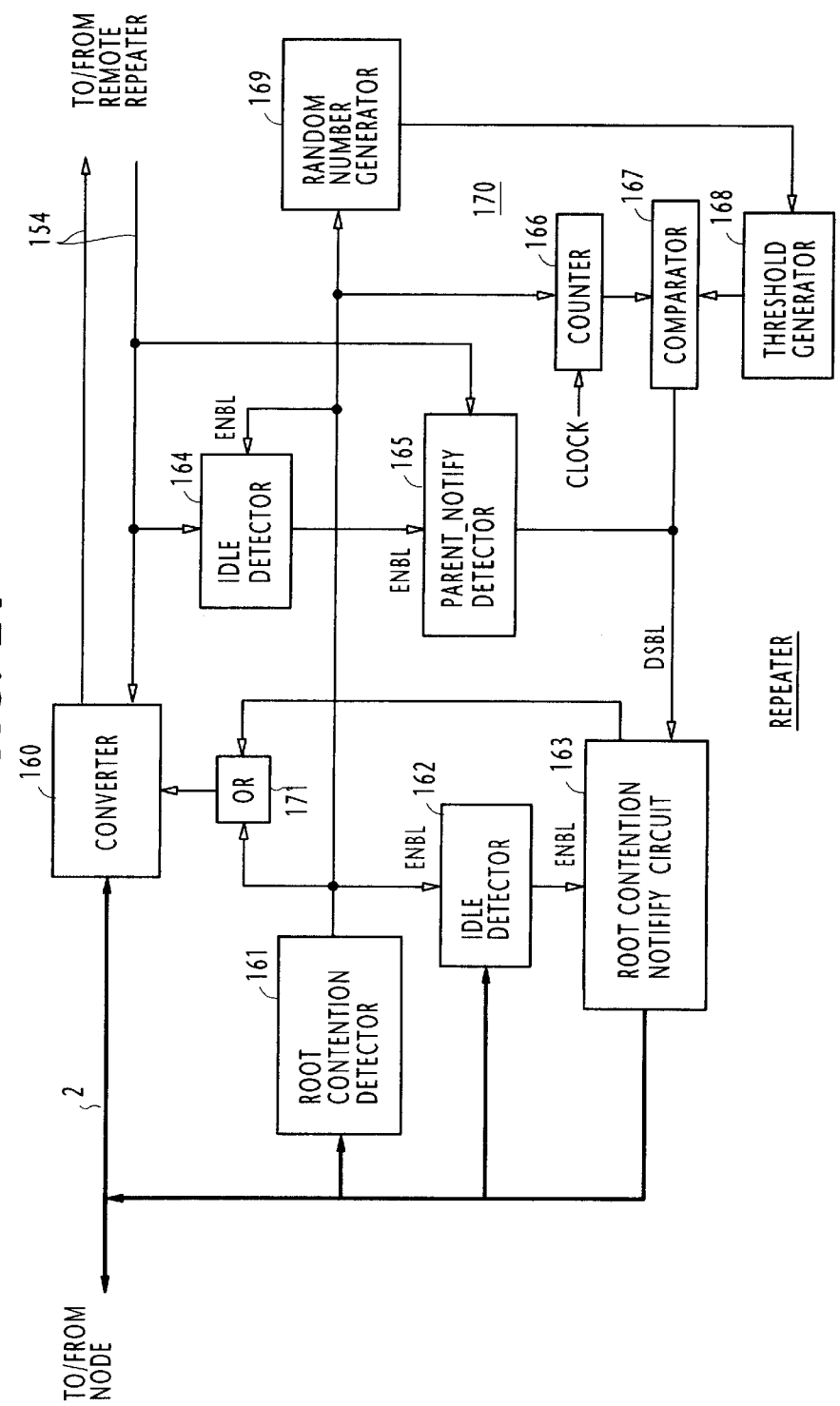

HANDSHAKING CIRCUIT FOR RESOLVING CONTENTION ON A TRANSMISSION MEDIUM REGARDLESS OF ITS LENGTH

RELATED APPLICATION

The present invention application is a continuation-in-part application of to co-pending U.S. patent application Ser. No. 09/047,330, "Handshaking Circuit for Resolving Contention on a Transmission Medium Regardless of its Length", filed Mar. 25, 1998, and assigned to the same assignor as the present application, now abandoned.

BACKGROUND OF THE INVENTION

1. Field of the Invention

The present invention relates to a handshaking circuit for a network of interconnected nodes for establishing a particular relationship, such as parent-child relationship, between adjacent nodes by resolving a contention therebetween which occurs on a transmission medium, such as serial bus, when they simultaneously assert the same protocol status.

2. Description of the Related Art

A handshaking protocol is standardized by the IEEE Computer Society for interconnecting nodes such as personal computers and associated electronic devices through their ports using a serial bus known as IEEE 1394. According to the IEEE 1394 standard, adjacent nodes first establish a parent-child relationship by having one of the nodes assert itself as a "child" of the other. In response, the other node recognizes itself as the parent of the child node and sends an acknowledgment. However, if the parent node has already asserted itself as a child node immediately before it recognizes the parenthood, a contention (collision) is said to occur between them. When both nodes detect this contention, they relinquish their assertion and wait a random period before making a second attempt.

However, the maximum random period is not sufficient to cover a bus length longer than the standard length of 4.5 meters. If the length of a serial bus is much longer than the standard length, there are instances where the contention cannot be resolved.

One solution to this problem would be to increase the time difference between the short and long random period values. Since the node is held in an inactive state during the time its random period timer is still counting clock, the use of a large fixed random value would result in an unnecessarily long interval to resolve a contention on short-length serial buses.

SUMMARY OF THE INVENTION

It is therefore an object of the present invention to provide a method of determining status of nodes regardless of the length of the transmission medium interconnecting the nodes.

According to a first aspect of the present invention, there is provided a handshaking circuit for establishing a particular relationship between nodes interconnected by a transmission medium. The handshaking circuit comprises a state detector for monitoring the transmission medium to detect a predetermined first state, a predetermined second state, a contention when the predetermined first states are simultaneously asserted on the transmission medium, and an idle state when either of the first and second states is not asserted on the transmission medium. A state machine is connected to the state detector for asserting the first state on the transmission medium to initiate a handshaking process and relinquishing the first state when the contention is detected by the state detector. A receive counter is connected to the state detector for continuously incrementing a receive count value from the instant the contention is detected to the instant the idle state is detected. A transmit counter is connected to the state detector and the state machine for continuously incrementing a transmit count value from the instant the first state is asserted to the instant the contention is detected. The receive count value is compared with the transmit count value. When the transmit count value is greater than the receive count value, the state machine asserts the first state on the transmission medium again and when the transmit count value is smaller than the receive count value, it asserts the second state on the transmission medium.

According to a second aspect, the present invention provides a handshaking circuit for establishing a particular relationship between nodes interconnected by a transmission medium. The handshaking circuit comprises a state detector for monitoring the transmission medium to detect a predetermined first state, a predetermined second state, a contention when the predetermined first states are simultaneously asserted on the transmission medium and an idle state when either of the first and second states is not asserted on the transmission medium. A state machine is connected to the state detector for asserting the first state on the transmission medium to initiate a handshaking process and relinquishing the first state when the contention is detected by the state detector. A receive counter is connected to the state detector for continuously incrementing a receive count value from the instant the contention is detected to the instant the idle state is detected. A transmit counter is connected to the state detector and the state machine for continuously incrementing a transmit count value from the instant the first state is asserted to the instant the contention is detected. A decision circuit produces a first decision output when the transmit and receive count values are lower than a predefined threshold and a second decision output when one of the transmit and receive count values is greater than the predefined threshold. A random period timer is activated in response to the detection of the contention by the state detector. The state machine is arranged to respond to the first decision output for asserting the first state on the transmission medium if the random period timer expires during the absence of the first and second states on the transmission medium and asserting the second state on the transmission medium if the random period timer expires during the presence of the first state on the transmission medium. The state machine responds to the second decision output for asserting the first state on the transmission medium when the transmit count value is greater than the receive count value and asserting the second state on the transmission medium when the transmit count value is smaller than the receive count value.

According to a first aspect of the present invention, there is provided a method of determining status of first and second nodes interconnected by a transmission medium, comprising the steps of (a) transmitting, from the first and second nodes, first and second request signals, respectively, to the transmission medium for asserting a parent state defined by the IEEE 1394 standard; and (b) setting the first node in the parent state and setting the second node in a child state defined by the IEEE 1394 standard, when the time of transmission of the first request signal is earlier than the time of transmission of the second request signal, and setting the first node in the child state and setting the second node in the parent state, when the time of transmission of the first request signal is later than the time of transmission of the second request signal.

According to a third aspect, the present invention provides a method of determining status of first and second nodes interconnected by a transmission medium, comprising the steps of (a) transmitting, from the first and second nodes, first and second request signals, respectively, to the transmission medium for asserting a first state, and (b) setting the first node in the first state and setting the second node in a second state, depending on the time of transmission of the first request signal relative to the time of transmission of the second request signal.

According to a fourth aspect, the present invention provides a method of determining status of local and remote nodes interconnected by a transmission medium, comprising the steps of (a) transmitting, from the local node, a first request signal to the transmission medium for asserting a first state, (b) causing a transmit counter in the local node to start incrementing a count value thereof in response to the transmission of the first request signal, (c) canceling the first request signal if a contention occurs on the transmission medium between the first request signal and a second request signal transmitted from the remote node, causing the transmit counter to stop incrementing the count value thereof, and causing a receive counter in the local node to start increment a count value thereof, and (d) causing the receive counter to stop incrementing the count value thereof when an idle state is detected on the transmission medium and setting the local node in the first state or in a second state depending on the count value of the transmit counter relative to the count value of the receive counter.

BRIEF DESCRIPTION OF THE DRAWINGS

The present invention will be described in further detail with reference to the accompanying drawings, in which:

FIG. 19 is a time sequence diagram of the handshaking circuits of FIG. 18 during a tree identify process between two contending nodes;

FIG. 20 is a schematic diagram of a network using repeaters between two nodes according to a further embodiment of the present invention;

FIG. 21 is a block diagram of each repeater of FIG. 20;

DETAILED DESCRIPTION

Figure 1:
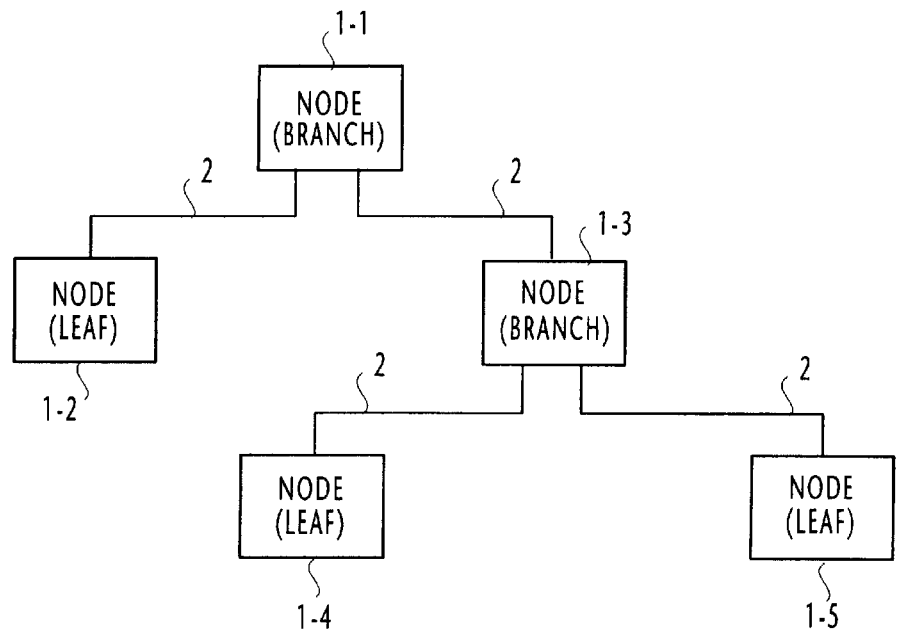
FIG. 1 is a block diagram of a network of nodes interconnected by serial buses according to the IEEE standard 1394.

Referring to FIG. 1, there is shown a network of nodes 1-1 to 1-5, such as personal computers and associated electronic devices, which are interconnected by serial buses 2 on which signals of the format standardized by the IEEE Computer Society under "IEEE Std 1394-1995", (or simply "the IEEE 1394") are transmitted. Each of the network nodes uses one or more ports for daisy-chain connection or branch connection to other nodes. Nodes 1-2, 1-4 and 1-5 use only one port for connection to another node and therefore they are called "leaf nodes" and nodes 1-1 and 1-3 use more than one port for connection to other nodes and therefore they are called "branch nodes".

The IEEE 1394 specifies a procedure for determining the parent-child relationships between adjacent nodes. This procedure, known as the tree identify process, begins following a bus reset procedure to configure the network into a tree with a unique root node and labels such port as connected to either the parent of a node or its children.

Figure 2:
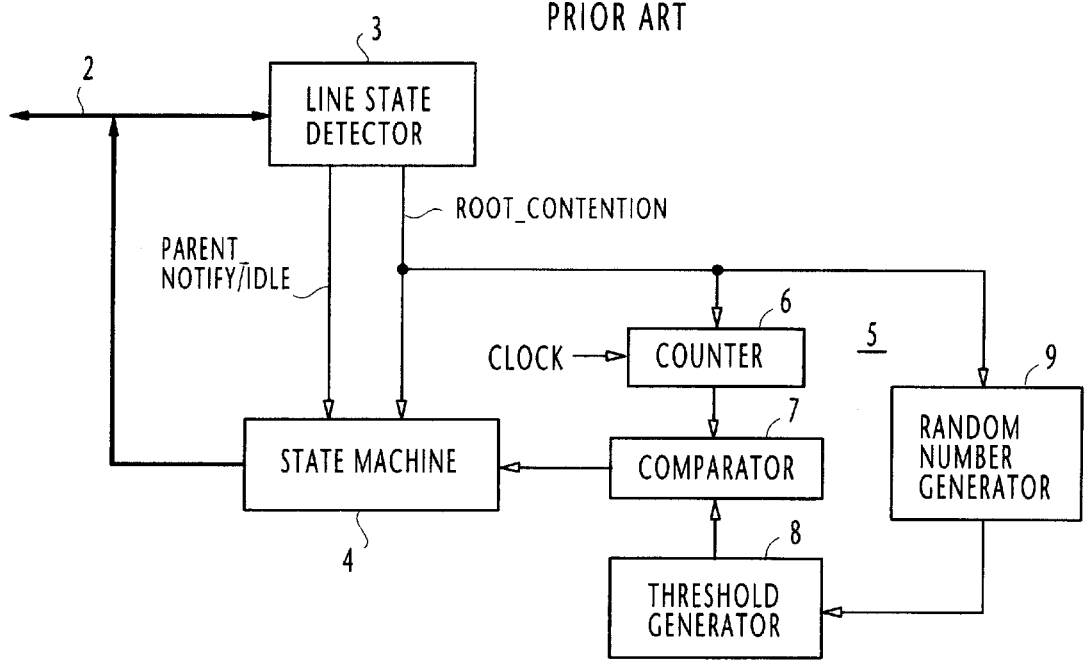
FIG. 2 is a block diagram of a prior art handshaking circuit.
Figure 3A:
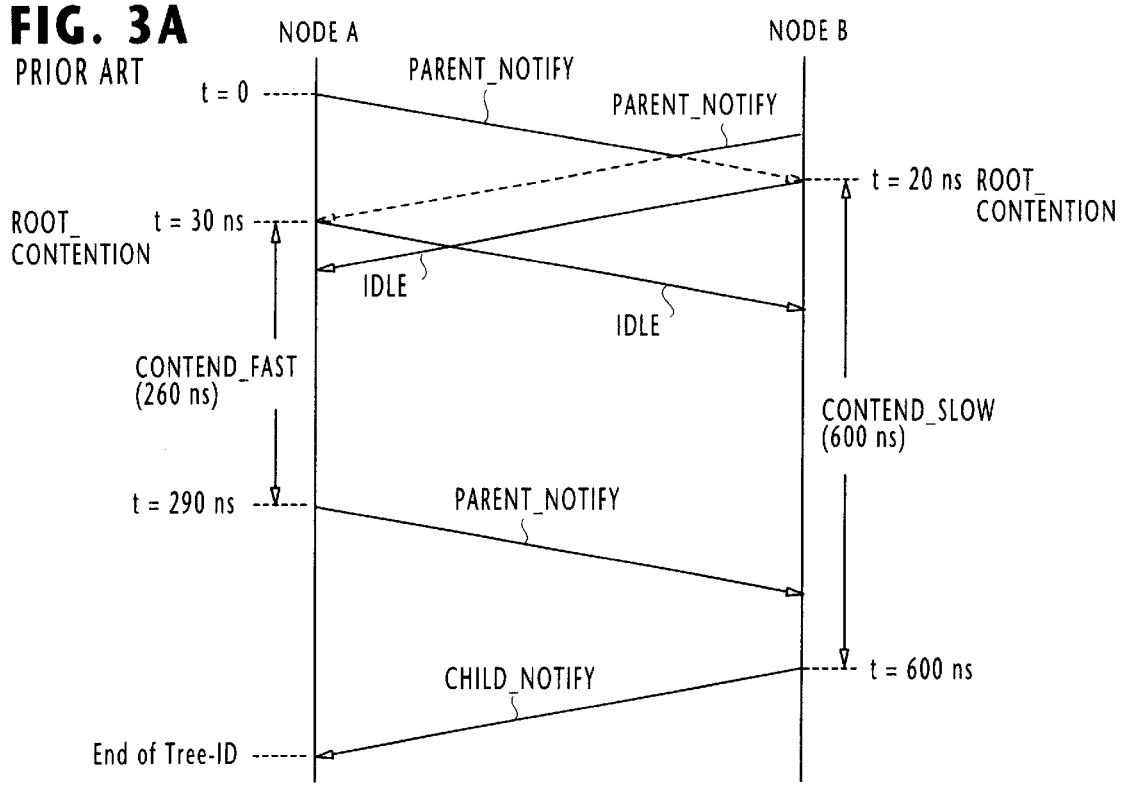
FIG. 3A is a time sequence diagram of the current procedure when the length of an internode transmission medium is within the specified maximum value.
Figure 3B:
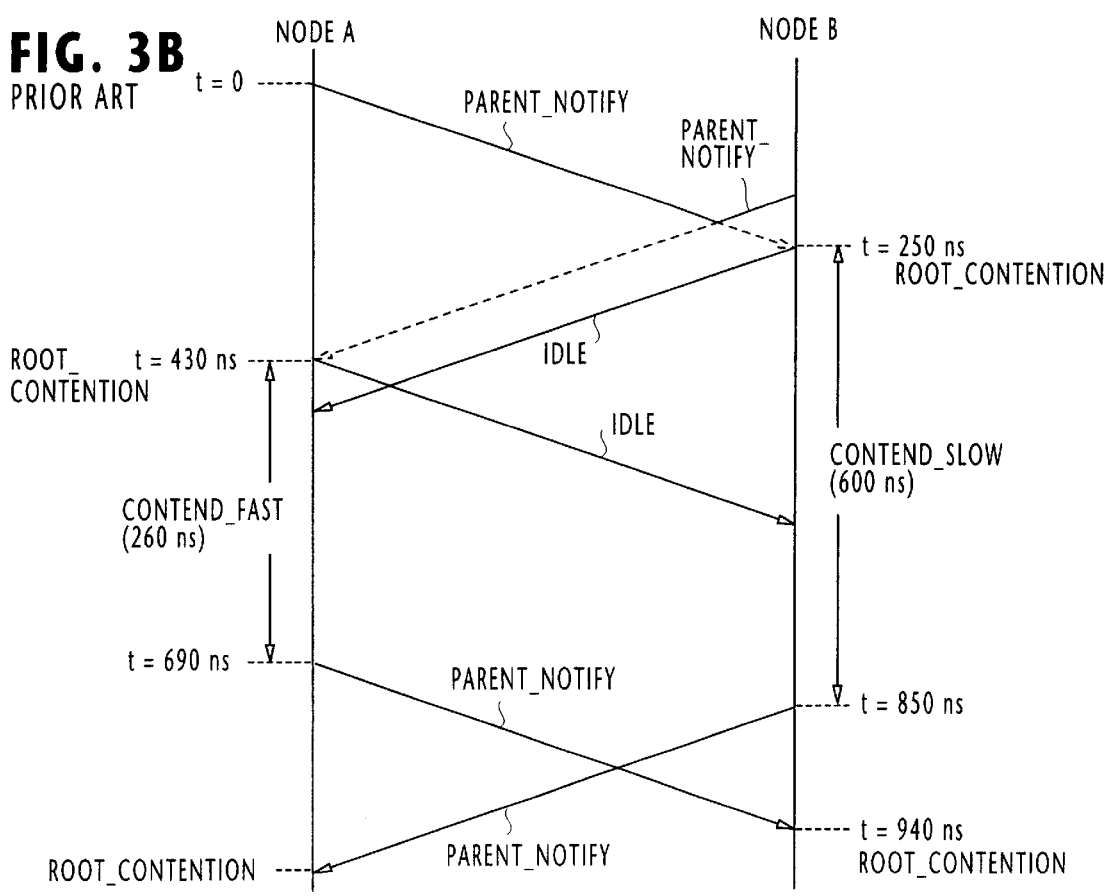
FIG. 3B is a time sequence diagram of the current procedure when the length of an internode transmission medium exceeds the specified maximum value.

Before proceeding with the detailed description of the present invention, it may prove helpful to provide an explanation of the prior art tree identify process with reference to FIGS. 2, 3A and 3B.

Each node has a handshaking circuit as shown in FIG. 2. The handshaking circuit includes a line state detector 3 and a notification circuit, or state machine 4, which connected to the serial bus, or cable 2. The line state detector 3 monitors incoming signals on the bus 2 and produces state indication signals. The state machine algorithm of the tree identify process is embodied in the state machine 4 to transmit a handshaking signal onto the output line of cable 2 by holding the state of the cable at one of Parent_Notify, Child_Notify and idle (i.e., absence of signal) according to the protocol of the tree identify process. When the state machine 4 changes the line state to Parent_Notify following the detection of Parent_Notify by the line state detector 3, a contention, known as a Root_Contention, is said to exist on the cable between adjacent nodes.

When a root contention occurs, the line state detector 3 produces a contention presence signal. In response, the state machine 4 relinquishes the Parent_Notify state and changes the line state to idle, and a counter 6 starts incrementing its clock count and supplies its output to a comparator 7. A random number generator 9 is activated in response to the contention presence signal and supplies a random number, which is binary 0 or 1, to a threshold generator 8. Threshold generator 8 assumes one of two threshold values depending on the random number. If the random number is 0, the threshold generator 8 produces a lower timeout threshold corresponding to the period of 260 ns (which is specified as Contend_Fast according to the tree identify protocol) and if the random number is 1, it produces a higher timeout threshold corresponding to the period of 600 ns (specified as Contend-Slow). The comparator 7 compares the output of the counter 6 with the random threshold value to produces an output when the clock count exceeds the random threshold value.

Thus, counter 6, comparator 7, threshold generator 8 and random number generator 9 constitute a random period timer 5. Depending on the random number, the random period timer 5 operates as a Contend_Fast timer or a Contend_Slow timer.

When the random period timer 5 expires, the state machine 4 asserts Parent_Notify state if the line state detector 3 is detecting an idle state on the cable or asserts Child_Notify state if the line state detector is detecting a Parent_Notify state.

During a tree identify process, a leaf node first changes its output line from idle state to Parent_Notify state, asserting itself as a child of the corresponding branch node. If the branch node responds to this by changing its output line from idle to Child_Notify state, the leaf node recognizes that it is a child of the branch node and relinquishes the Parent_Notify request. A parent-child relationship is established in this way. However, if the branch node has already asserted Parent_Notify state after the leaf node asserted Parent_Notify state, a collision occurs on the serial bus 2 and both signals changes to a contention-indicating state defined by the 1394 standard. Thus, the branch and leaf nodes recognize that a root contention has occurred.

Note that Parent_Notify and Child_Notify states are asserted in the form of continuous signals. Simultaneous presence of Parent_Notify states on a serial bus causes the transmitted continuous signals to change their format at the point of collision and transmitted as a corrupted signal in such a way that the receiving node can recognize the occurrence of a contention. Thus, the corrupted signal is present on the transmission medium 2 until the sending node relinquishes the Parent_Notify request. However, the format of these protocol signals is such that even though Parent_Notify and Child_Notify are simultaneously present on the transmission medium, the state of these signals does not change during propagation through the serial bus.

FIG. 3A shows a time sequence in which the operation of the prior art handshaking circuits of a node A (leaf) and a node B (branch) proceeds when such a contention occurs.

When the state machine 4 of node A knows that the line state detector 3 is detecting an idle state, it asserts Parent_Notify request at time t=0. Following a propagation delay time of 20 nanoseconds, the line state detector 3 of node B recognizes that the line state has changed to Parent_Notify. If the state machine 4 of node B has already asserted Parent Notify state, node B will recognize, at time t=20 ns, that a contention has occurred, and immediately relinquishes Parent_Notify request so that the cable changes to idle state. Thus, at time t=30 ns, node A detects the contention and relinquishes its Parent_Notify state, changing the line to idle.

At nodes A and B, counters 6 and random number generators 9 are started at instants t=30 ns and t=20 ns, respectively. If the random numbers of nodes A and B are 0 and 1, respectively, node A is said to have a Contend_Fast timer (260 ns) and node B a Contend_Slow timer (600 ns). Thus, at time t=290 ns, node A asserts Parent_Notify request again.

At time t=600 ns, the Contend_Slow timer expires. Due to the presence of the Parent_Notify state, node B asserts Child_Notify state, recognizing itself as the parent of leaf node A. Node A thus recognizes itself as a child of branch node B.

However, the time difference between the Contend_Slow and Contend_Fast timers is determined on the condition that the maximum bus length is 4.5 meters. Therefore, if the bus length is longer than 4.5 meters, unfavorable situations might occur and root contention cannot be resolved.

For example, if the bus length is 50 meters, the propagation delay time of the bus is approximately 250 ns as shown in FIG. 3B. If the nodes A and B obtain the same random numbers as in the case of FIG. 3A, node A will recognize the occurrence of a root contention at time t=430 ns and asserts a Parent_Notify request at time t=690 ns. Node B, on the other hand, recognizes, at time t=850 ns, that its input line is in an idle state and asserts a Parent_Notify request. Since this change of state is recognized by node B at time t=940 ns, a root contention occurs again.

Figure 4:
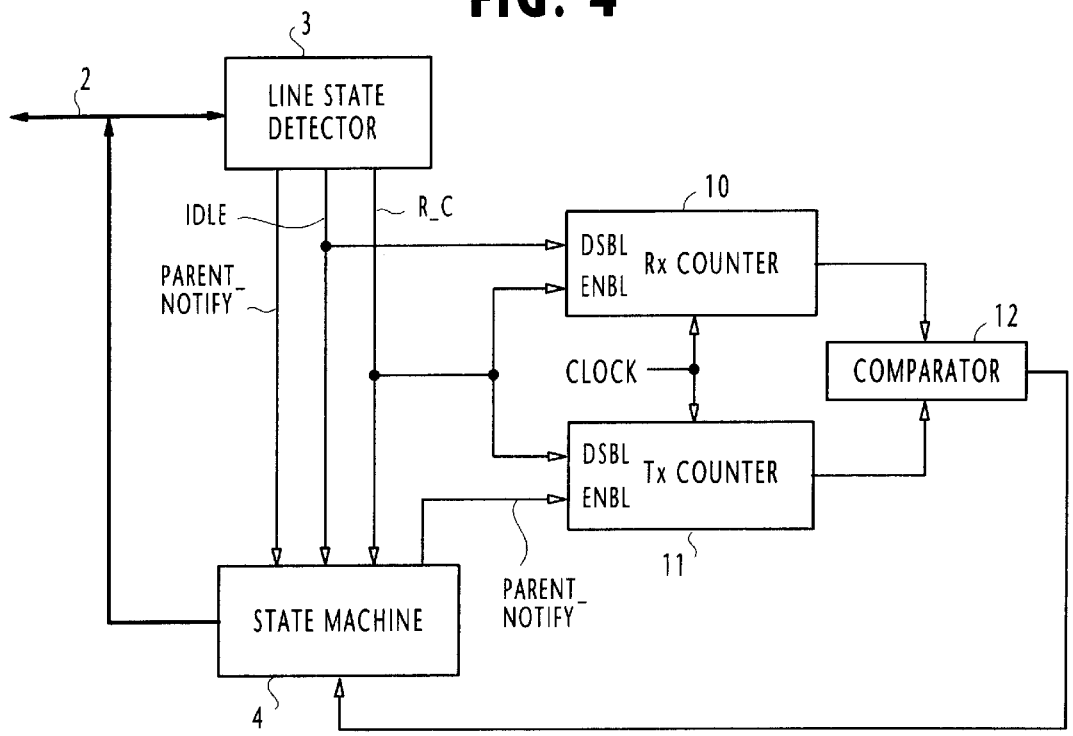
FIG. 4 is a block diagram of a handshaking circuit according to one embodiment of the present invention.

In order to overcome this problem, the present invention provides a handshaking circuit as shown in FIG. 4. This handshaking circuit comprises receive and transmit counters 10 and 11 and a comparator 12 in addition to the line state detector 3 and state machine 4 of FIG. 2.

When the state machine 4 asserts a Parent_Notify request on the serial bus 2, it simultaneously enables the transmit counter 11 to start incrementing a transmit count (Tx). When the line state detector 3 detects a root contention, it disables the transmit counter 11 to stop the transmit count and enables the receive counter 10 to start incrementing a receive count (Rx), while informing the state machine 4 of the occurrence of a contention. State machine 4 responds to the contention by relinquishing the Parent_Notify request. When the line state detector 3 detects an idle state, it disables the receive counter 10 to stop the receive count value, and informs the state machine 4 of this idle line state.

Thus, the counters 10 and 11 stop counting their clock to supply their outputs to the comparator 12. The receive and transmit count values are compared with each other and their relative values are determined to produce a comparator output. The comparator output is supplied to the state machine 4. If the comparator output of a given node indicates that the transmit counter 11 has attained a greater value than that of receive counter 10, the state machine 4 of this node is the first to assert a Parent_Notify request again. If the comparator output indicates otherwise (i.e., the output of transmit counter 11 is smaller than that of receive counter 10), the state machine 4 of this node may assert a Child_Notify state in response to the output of comparator 12 or in response to a Parent_Notify indication from the line state detector 3.

Figure 5:
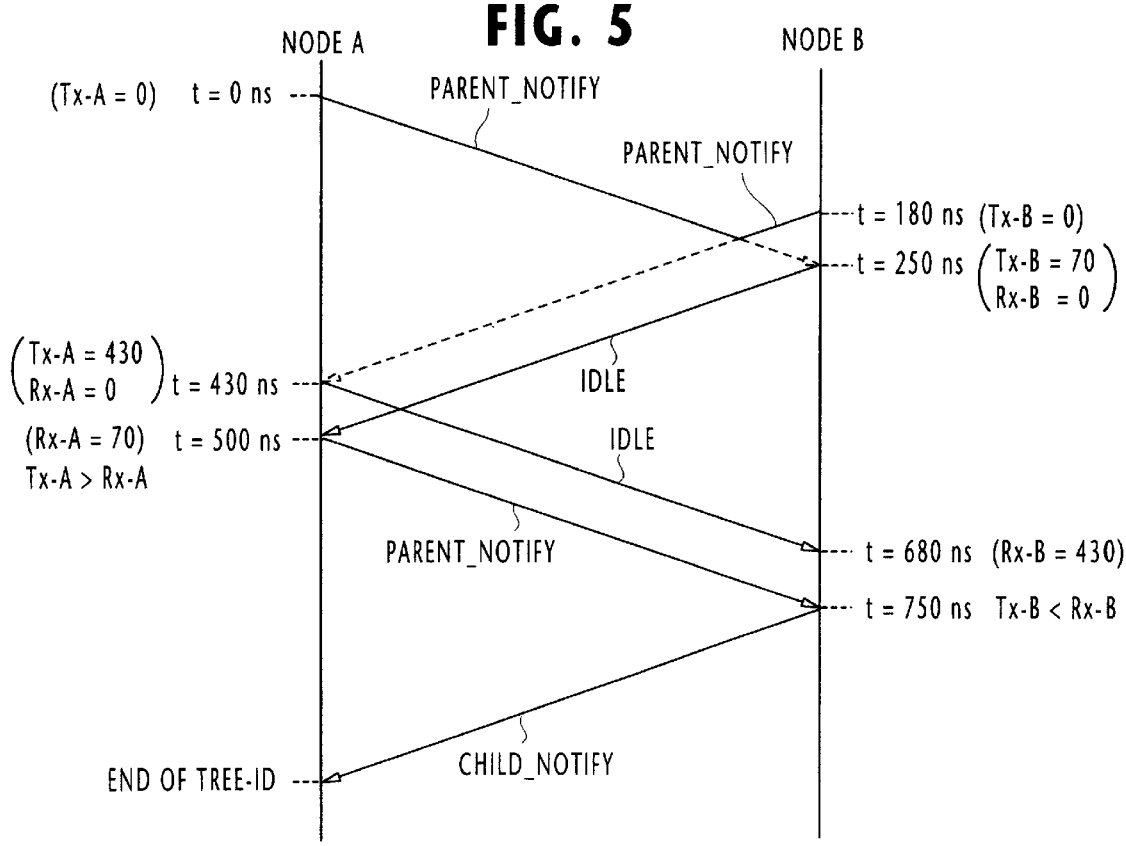
FIG. 5 is a time sequence diagram of the handshaking circuits of FIG. 4 during a tree identify process between two contending nodes.

The time sequence diagram shown in FIG. 5 illustrates the operation of the handshaking circuit of FIG. 4 when a root contention arises on a serial bus with a propagation delay of 250 ns between nodes A and B which are leaf and branch nodes, respectively.

When the state machine 4 of node A recognizes that the line state detector 3 is detecting that the input line is in an idle state, it changes its output line to Parent_Notify state at time t=0 ns, and enables its transmit counter 11 to start incrementing its count from the initial value (Tx–A=0).

Meanwhile, at node B, the state machine 4 has changed its output line from idle to Parent_Notify state at time t=180 ns and has enabled its transmit counter 11 to start incrementing its count from the initial value (Tx–B=0).

At time t=250 ns, the line state detector 3 of node B detects a root contention, notifies the state machine 4 of this fact, enables the receive counter 10 to start incrementing the receive count from the initial value (Rx–B=0) and disables the transmit counter 11 so that a transmit count value Tx–B=70 is obtained. State machine 4 of node B thus relinquishes the Parent_Notify request and the line state changes to idle.

At time t=430 ns, the line state detector 3 of node A detects the root contention, notifies the state machine 4 of this fact, enables the receive counter 10 to start incrementing its count from the initial value (Rx–A=0) and disables the transmit counter 11 so that a transmit count value of Tx–A= 430 is obtained. State machine 4 of node A thus relinquishes the Parent_Notify request and the line state changes to idle.

At time t=500 ns, the line state detector 3 of node A senses that its input line has changed to idle state, notifies the state machine 4 of this fact and disables the receive counter 10, producing a receive count value of Rx–A=70. Since Tx–A is greater than Rx–A and since node A is currently detecting idle state, it is entitled to assert a Parent_Notify request again.

At time t=680 ns, the receive counter 10 of node B is disabled, producing a receive count value of Rx–B=430. Since, Tx–B is smaller than Rx–B, the state machine 4 of node B asserts a Child_Notify response when it is informed, at time t=750 ns, that the state of the serial bus has changed from idle to Parent_Notify.

As a result, a contention between nodes A and B is resolved and a parent-child relationship is established, regardless of the length of the serial bus, and node A recognizes itself as a child of branch node B and branch node B as the parent of leaf node A.

Figure 6:
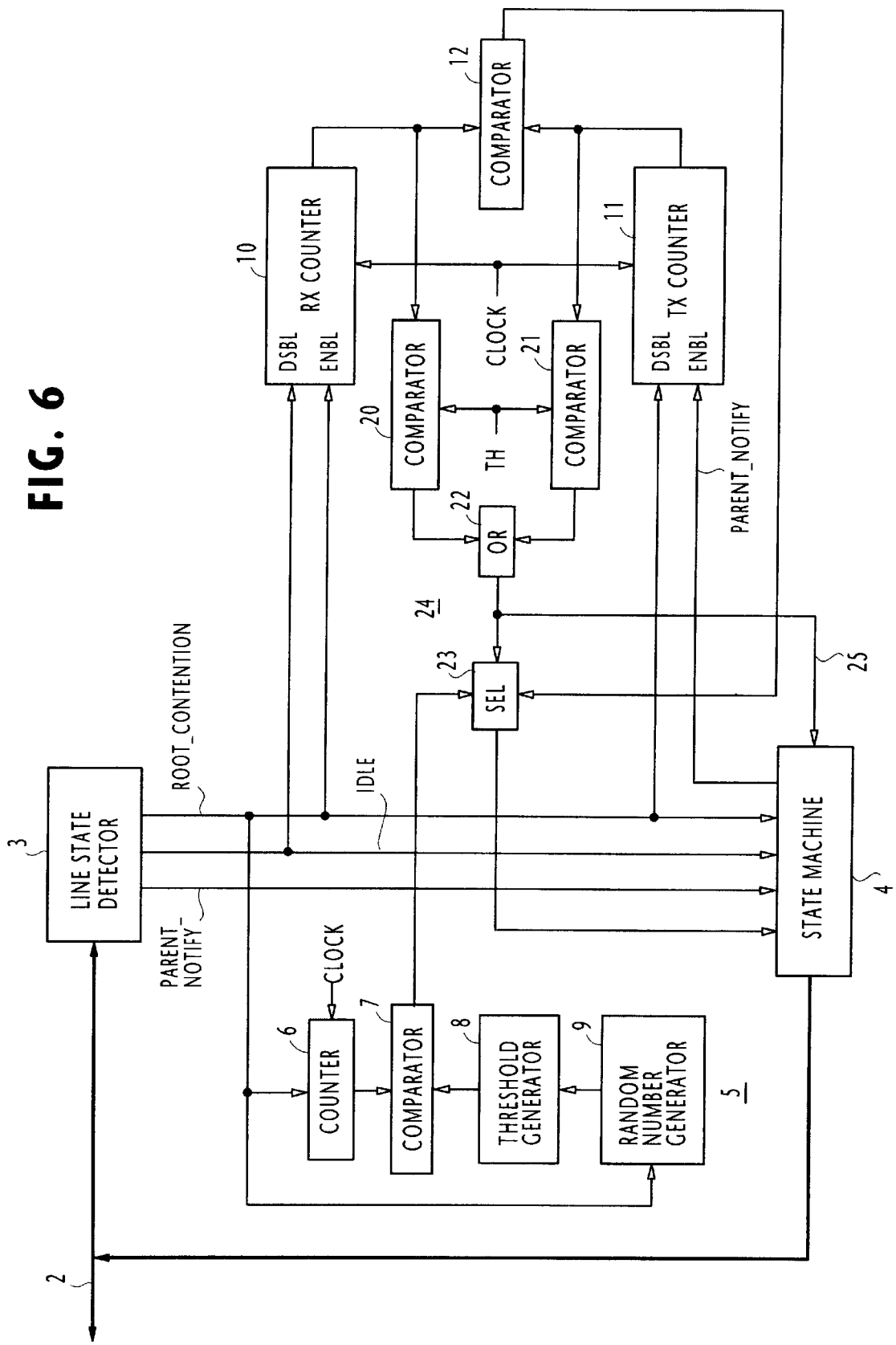
FIG. 6 is a block diagram of a handshaking circuit according to a further embodiment of the present invention.

FIG. 6 shows a modified embodiment of the present invention in which parts corresponding in significance to those in FIGS. 2 and 4 are marked with the same numerals as those in these figures. This modification is a combination of the handshaking circuits of the prior art and the previous embodiment and a decision circuit that determines which of these handshaking circuits is to be used depending on the transmit and receive count values relative to a predefined threshold.

For this purpose, comparators 20 and 21 are connected to the outputs of receive and transmit counters 10 and 11, respectively, for comparison with a timeout threshold value representing a delay time of 100 ns, for example, which is twice the round-trip propagation delay (50 ns) of a bus length 4.5 meters. When one of the receive and transmit counters 10 and 11 exceeds the timeout threshold value, the corresponding one of comparators 20 and 21 produces a binary 1 at the corresponding input of an OR gate 22. Thus, when both counters do not exceed the threshold value both comparators 20 and 21 produce a binary 0 and hence the output of OR gate 22 is at binary 0. The output of OR gate 22 is connected to a selector 23, to which the output comparators 7 and 12 are also connected.

When the output of OR gate 22 is a binary 0, the selector 23 selects and couples the output of comparator 7 to the state machine 4. When the output of OR gate 22 is a binary 1, the selector 23 selects and couples the output of comparator 12 to the state machine 4. State machine 4 is supplied with the output of OR gate 22 via a line 25 to indicate in which mode the state machine is to be operated.

When either of the receive and transmit counters do not exceeds the threshold of 100 ns (thus, the output of OR gate is binary 0) and the comparator 7 produces a timeout signal, the state machine 4 is signaled by the output of OR gate 22 via line 25 that it should respond to the output of comparator 7 for operating in the random timer mode of FIG. 2. When one of the receive and transmit counters exceeds the threshold of 100 ns (thus, the output of OR gate is binary 1) and the comparator 12 produces an output indicating which of the receive and transmit counters is greater, the state machine 4 is signaled by the output of OR gate 22 via line 25 that it should respond to the output of comparator 12 for operating in the counter mode of FIG. 4.

In summary, the elements 20, 21, 22 and 23 constitute a decision circuit 24 that supplies the state machine 4 with a first decision output to allow it to operate in the random time mode when the transmit and receive count values are both lower than the 100-ns threshold and with a second decision output to allow it to operate in the counter mode when one of the transmit and receive count values is greater than the threshold. State machine 4 responds to the first decision output for asserting the Parent_Notify state on the serial bus if the random period timer 5 expires during the presence of idle on the serial bus and asserting the Child_Notify state if the random period timer 5 expires during the presence of the Parent_Notify state. State machine 4 responds to the second decision output for asserting the Parent_Notify state when the transmit count value is greater than the receive count value and asserting the Child_Notify state when the transmit count value is smaller than the receive count value.

Figure 7:
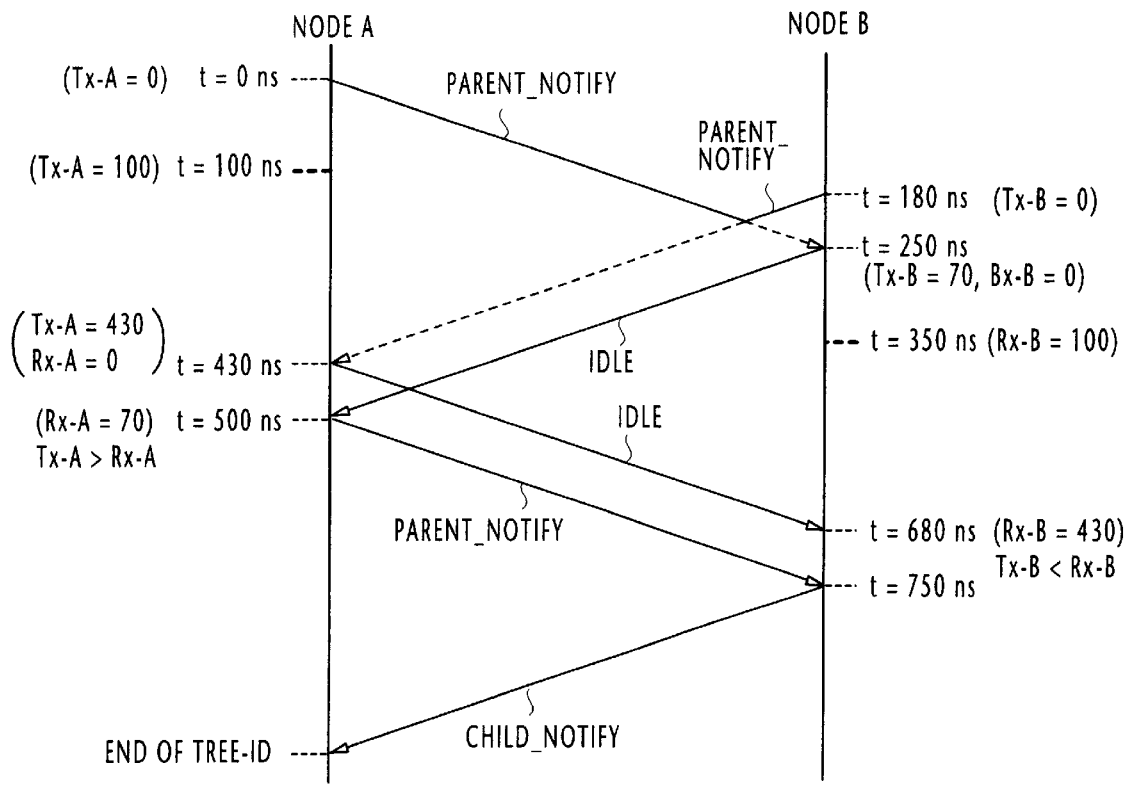
FIG. 7 is a time sequence diagram of the handshaking circuits of FIG. 6, during a tree identify process between two contending nodes.

As illustrated in FIG. 7, if node B asserts Parent_Notify state 180 ns after node A initially asserted Parent_Notify in a manner similar to FIG. 5, a contention occurs. If the serial bus 2 is 50 meters long (corresponding to a single-trip propagation delay of 250 ns), the receive counter 10 of node B reaches the threshold value of the comparator 20 at time t=350 ns, which, as described above, corresponds to the point of determination for node B between the random time mode and the counter mode, as illustrated in FIG. 7.

Since the transmit counter 11 of node A has already exceeded the threshold value of comparator 21 when its line state detector 3 detects the contention at time t=430 ns, and the transmit counter 11 of node B has already exceeded the threshold value of comparator 21 when its line state detector 3 detects the idle state at time t=680 ns, nodes A and B operate in the counter mode to resolve the contention in a manner similar to FIG. 5. It is seen that if the round-trip propagation delay of the serial bus is 40 ns, for example, the handshaking circuit operates in the random time mode to resolve the contention as shown in FIG. 3A.

Figure 8:
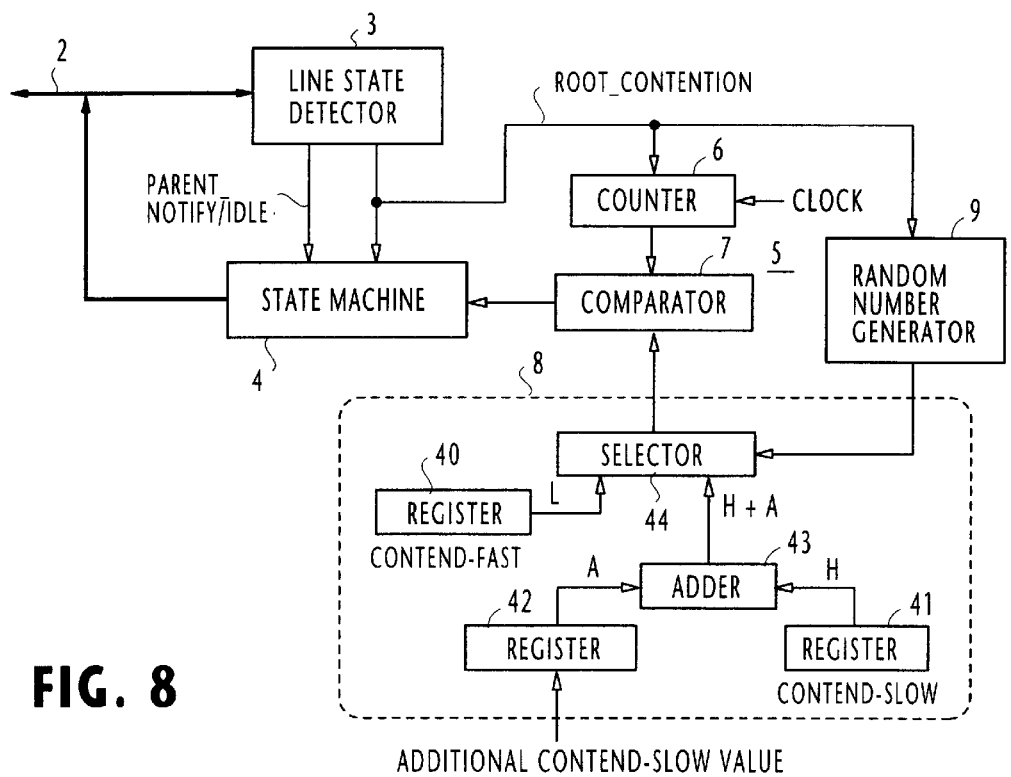
FIG. 8 is a block diagram of a handshaking circuit according to a modified embodiment of the present invention.

FIG. 8 shows another embodiment of the handshaking circuit in which the prior art threshold generator 8 of FIG. 2 is modified so that it comprises a register 40 for holding a fixed lower threshold value corresponding to the Contend_Fast time of 260 ns, a register 41 for holding a fixed higher threshold value corresponding to the Contend_Slow time of 600 ns, and a register 42 for storing a variable threshold value as an additional Contend_Slow timer value. An adder 43 is provided for summing the contents of registers 41 and 42. One of the outputs of adder 43 and register 40 is selected by a selector 44 according to the output of random number generator 9. The output of selector 44 is supplied as a random threshold value to the comparator 7. The fixed value of register 41 corresponds to the nominal length of the serial bus. The value of register 42 is manually set so that it corresponds to the distance by which the length of the serial bus exceeds the nominal bus length.

Figure 9:
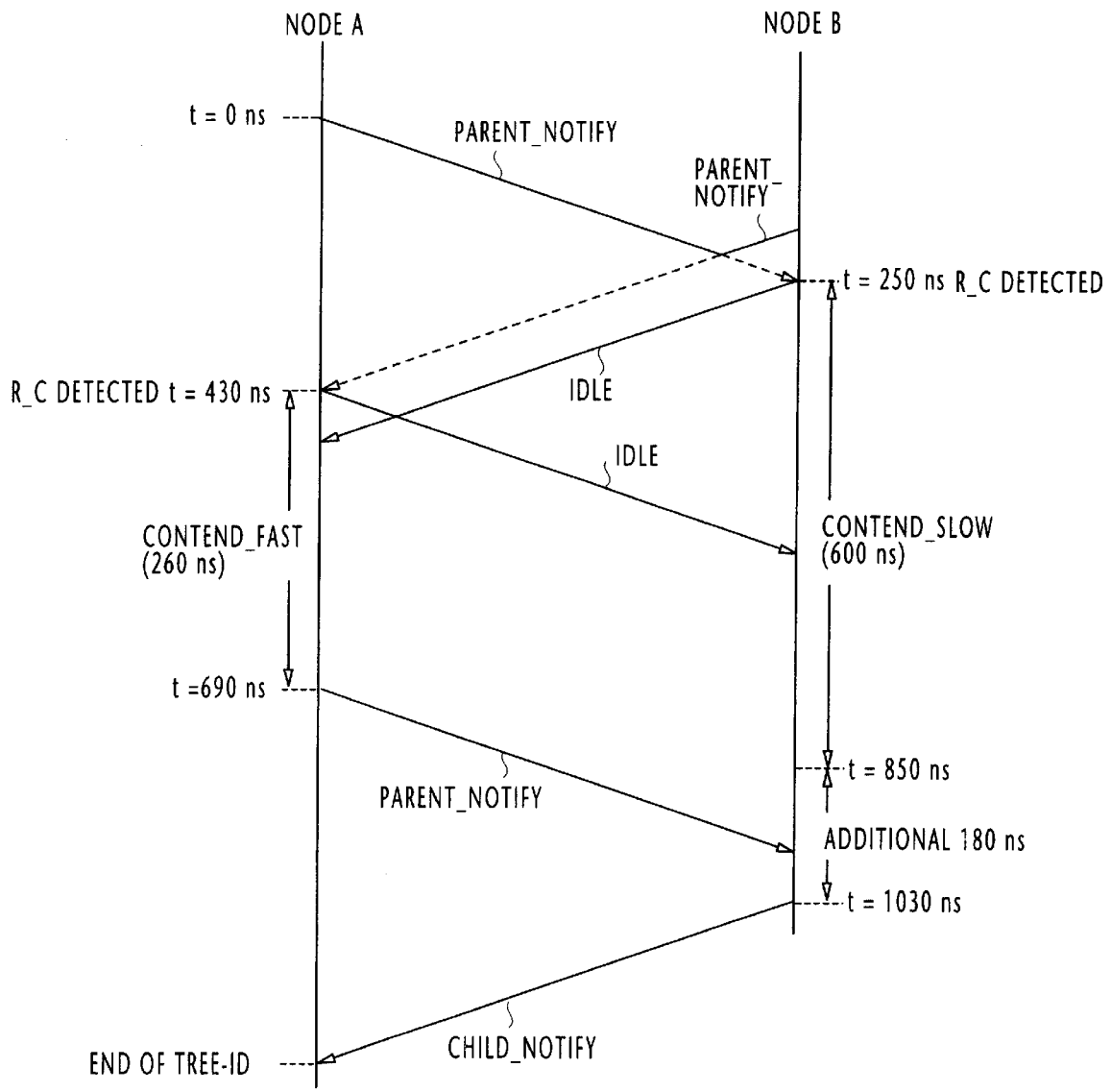
FIG. 9 is a time sequence diagram of the handshaking circuits of FIG. 8 during a tree identify process between two contending nodes.

If the additional threshold value of register 42 corresponds to a delay time of 180 ns and the serial bus has a length of 50 meters (where the round-trip propagation delay is approximately 500 ns), the line state detector 3 of node B detects Parent_Notify state within the extended time window of 180 ns, as shown in FIG. 9, provided that the same random numbers are adopted by nodes A and B as those in FIG. 3B. As a result, node B asserts Child_Notify state when its line state detector 3 senses a Parent_Notify state at time t=1030 ns. Root contention on a serial bus longer than the nominal value can be resolved by adjusting the value of register 42.

Figure 10:
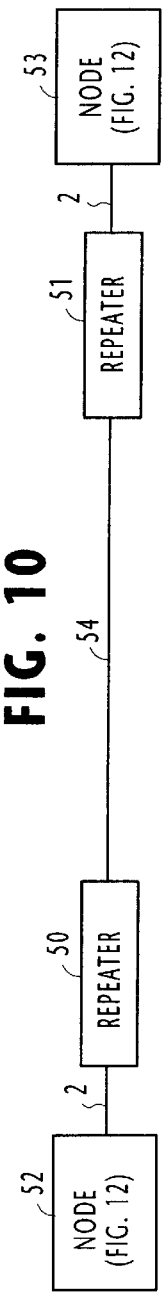
FIG. 10 is a schematic diagram of a network using repeaters between two nodes according to a further embodiment of the present invention.

FIG. 10 is a block diagram illustrating another embodiment of this invention in which repeaters 50 and 51 (FIG. 11) are provided at the opposite end of the serial bus 2 and used in combination of handshaking circuits (FIG. 12) of nodes 52 and 53.

Figure 11:
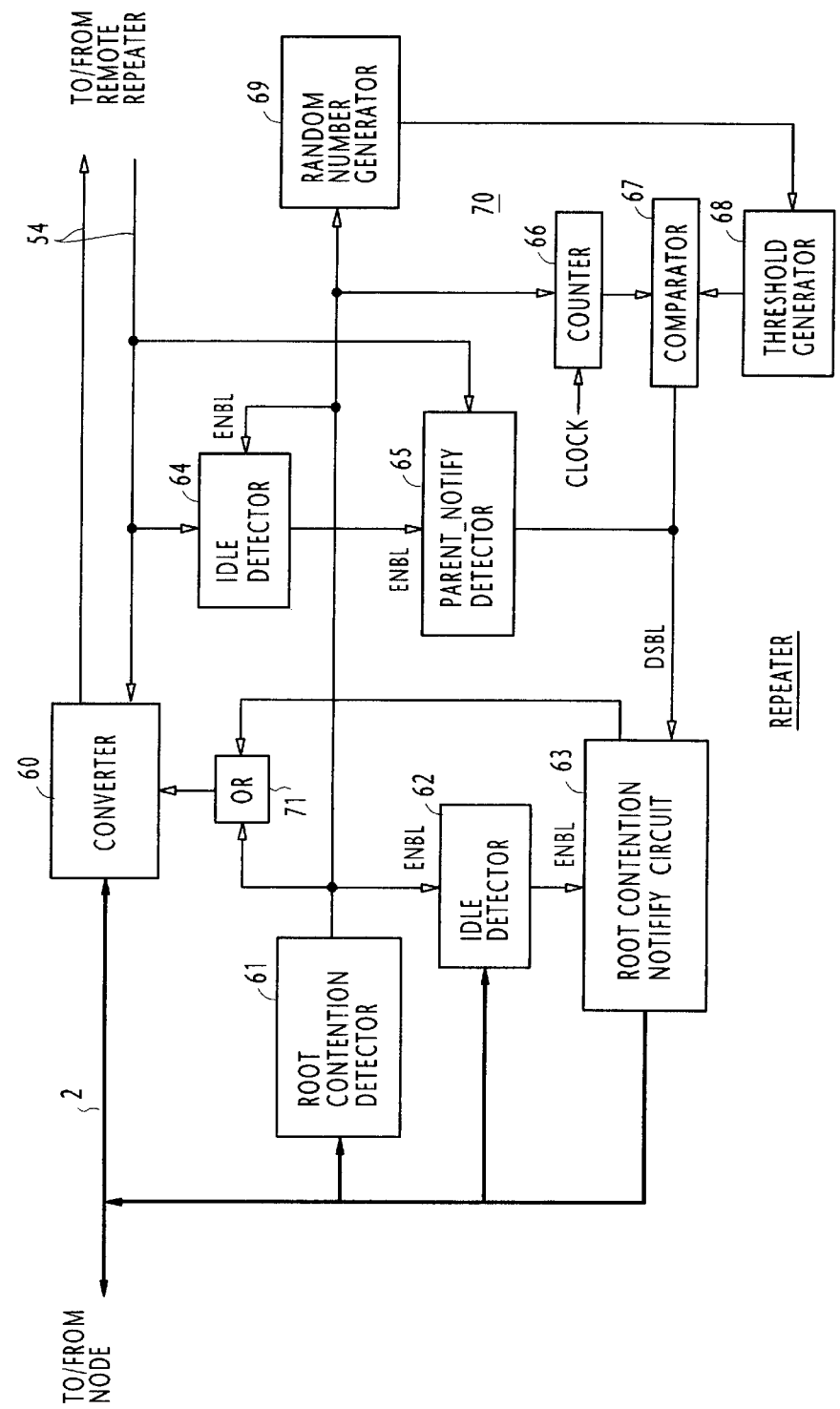
FIG. 11 is a block diagram of each repeater of FIG. 10.

As shown in detail in FIG. 11, each repeater includes a format converter 60 interposed between the serial bus 2 with which it is connected to the handshaking circuit of the local node and a cable 54 with it is connected to a remote repeater. Converter 60 performs conversion between the 1394 standard format on the serial bus 2 and the usual bipolar format on the cable 54.

A Root_Contention detector 61 is provided for detecting a root contention on the serial bus 2 to produce a contention presence signal. Idle detectors 62 and 64 are connected to the serial bus 2 and the high-speed cable 54, respectively, to detect an idle state and produce an output when they are enabled by the contention presence signal. A root contention notify circuit 63 is provided to respond to the output of idle detector 62 for setting the serial bus 2 at Root_Contention_Notify state for the purpose of locking the handshaking circuit of the local node in an inactive state. At the same time, the notify circuit 63 supplies a disable signal via an OR gate 71 to the converter 60 to prevent it from passing the signal; from the remote repeater to the local node when the RC notify circuit 63 is supplying a signal to the local node, instead of the signal from the remote repeater. The output of root contention detector 61 is also applied as a disable signal via the OR gate 71 to the converter 60 to prevent it from passing the remote signal to the local node when a root contention is detected.

A Parent_Notify detector 65 is connected to the input line of cable 54 to disable the RC notify circuit 63 when the line state changes to Parent_Notify after the detector 65 is enabled by the output of idle detector 64.

Figure 12:
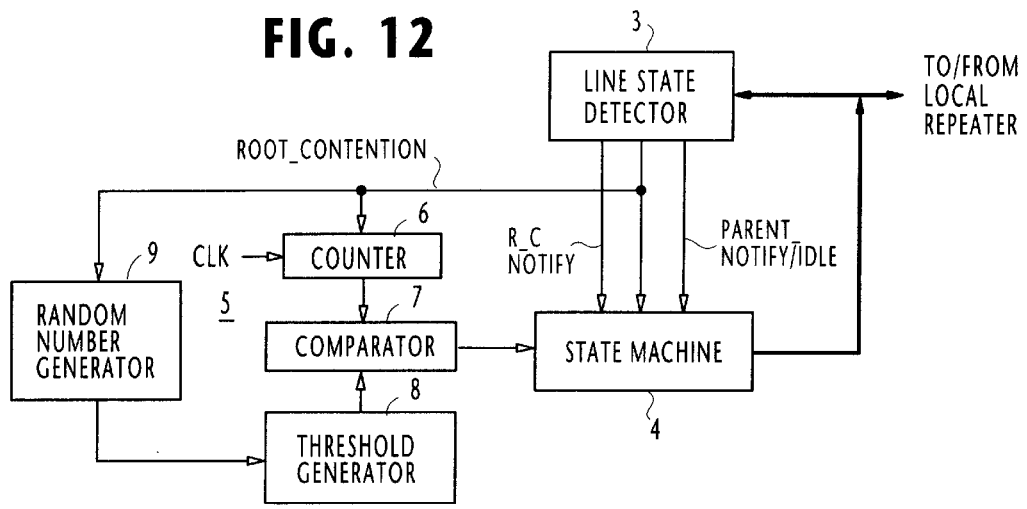
FIG. 12 is a block diagram of each handshaking circuit of FIG. 10.

Counter 66 starts incrementing a clock count in response to the contention presence signal from detector 61. Random number generator 69 is also responsive to the contention presence signal to produce a random number of either 1 or 0. Threshold generator 68 produces a lower threshold value corresponding to 260 ns (Contend_Fast). According to this embodiment, this threshold generator has a higher threshold value corresponding to 780 ns (Contend Slow) which is larger than the higher random threshold value specified by the 1394 standard. Depending on the output of random number generator 69, the threshold generator 68 selects one of the threshold values. Comparator 67 produces an output indicating the value of the clock count relative to the threshold value and disables the state machine 63 when the clock count exceeds the threshold value. Elements 66 to 69 thus constitute a random period timer 70. FIG. 12 shows the handshaking circuit used by the nodes 52 and 53. As illustrated, this handshaking circuit is similar to that shown in FIG. 2 except that the line state detector 3 responds to the Root_Contention Notify state on the serial bus 2 from the local repeater for locking the state machine 4 so that it is prevented from responding to a state indication signal from the line state detector 3 at the time the random period timer 5 expires.

Figure 13:
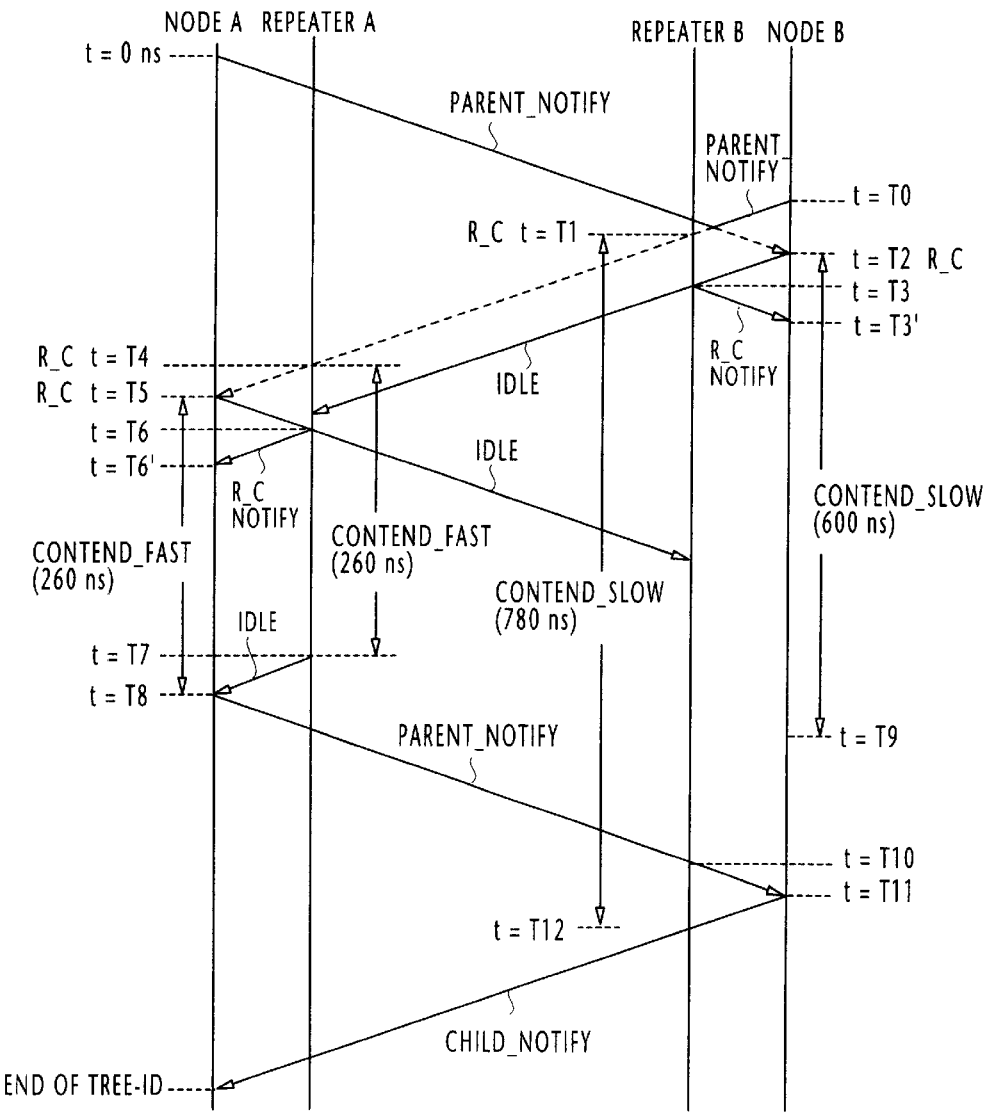
FIG. 13 is a time sequence diagram of a tree identify process of the repeaters of FIG. 11 and the prior art handshaking circuits of FIG. 12.

The following is a description of the root contention resolution procedure of the repeaters and handshaking circuits of FIGS. 11 and 12 with the aid of the time sequence diagram of FIG. 13 by assuming that node A and repeater A determine a period of 260 ns, repeater B determines a period of 780 ns and node B determines a period of 600 ns.

At time t=0, node A (leaf node) asserts Parent_Notify state, which is converted by repeaters A and B and detected by node B at time T2 as a root contention since node B has already asserted Parent_Notify at time T0. Thus, repeater B detects a root contention at time T1 and starts its counter 66 and node B changes the local serial bus 2 to an idle state at time T2 and enables its counter 6. Repeater B changes the local serial bus 2 to Root_Contention_Notify state (instead of the corrupted Parent_Notify state) at time T3 when its idle detector 62 senses the idle state on the serial bus 2.

At time T4, the Parent_Notify state asserted at T0 is sensed by repeater A as a root contention, and relayed to node A, which also senses it at time T5 as a root contention and relinquishes the Parent_Notify state and sets the serial bus to an idle state, while starting its counter 6. Repeater A detects this idle state at time T6 and changes the input line of node A to Root_Contention_Notify state (instead of the corrupted Parent_Notify state).

At time T7, the counter 66 of repeater A reaches the random period of 260 ns, causing the contention notify circuit 63 to relinquish the R_C_Notify state, thus setting the serial bus to idle. At time T8, the counter 6 of node A reaches the Contend_Fast period of 260 ns.

Due to the occurrence of the idle state at its input line at time T8, node A, which has been locked from time T6', is now unlocked and asserts a Parent_Notify state again as a child of node B.

At time T9, the counter 6 of node B reaches the Contend_Slow period of 600 ns. Since node B has been in a locked state from time T3' due to the presence of the R_C_Notify state, its state machine 4 does not change its Parent_Notify state although its Contend_Slow period already expired at time T9.

At time T10, the Parent_Notify detector 65 of repeater B detects the Parent_Notify state and disables the contention notify circuit 63 so that the serial bus 2 of node B changes from R_C_Notify to Parent_Notify state, which the node B senses at time T11. Thus, node B responds to this Parent_Notify state and asserts a Child-Notify state as a parent of node A. At time T12, the Contend_Slow period of repeater B expires when its counter 66 reaches the timeout threshold of 780 ns.

The following description is concerned with modifications of the previous embodiments, in which FIGS. 14 to 23 correspond to FIGS. 4 to 13, respectively.

Figure 14:
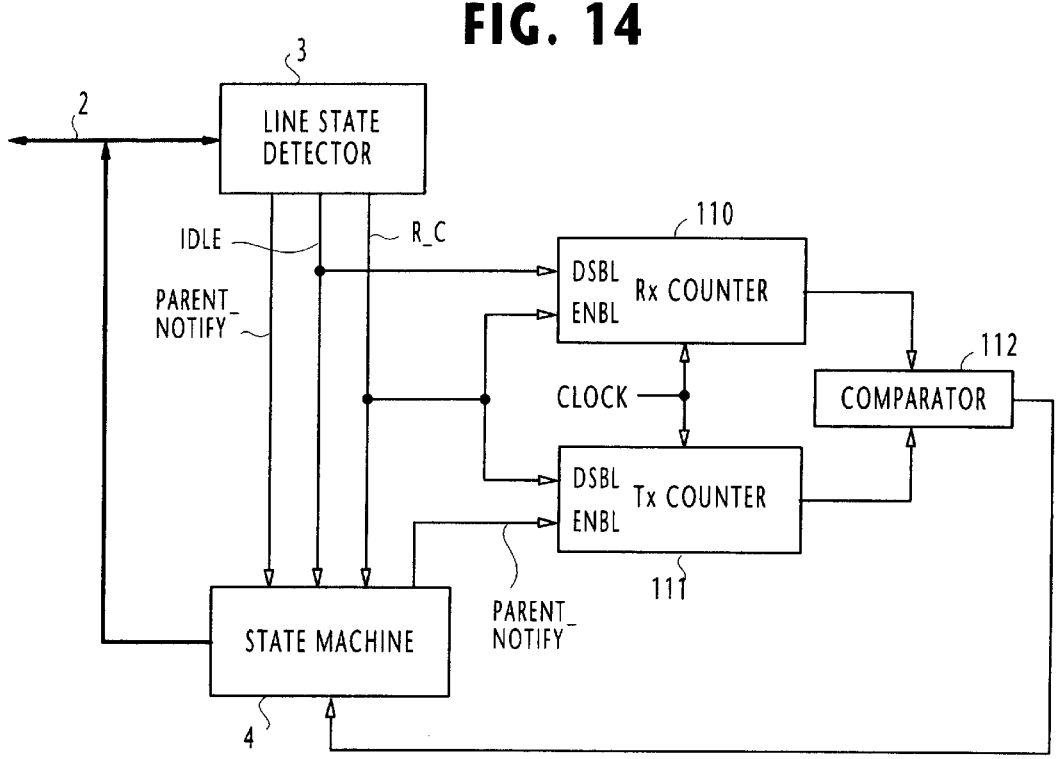
FIG. 14 is a block diagram of a modification of the embodiment of FIG. 4.

This handshaking circuit of FIG. 14 comprises receive and transmit counters 110 and 111 and a comparator 112 in addition to the line state detector 3 and state machine 4 of FIG. 2.

When the state machine 4 asserts a Child Notify request on the serial bus 2, it simultaneously enables the transmit counter 111 to start incrementing transmit count (Tx). When the line state detector 3 detects a root contention, it disables the transmit counter 111 to stop incrementing its transmit count and enables the receive counter 110 to start incrementing receive count (Rx), while informing the state machine 4 of the occurrence of a contention. State machine 4 responds to the contention by relinquishing the Child_Notify request. When the line state detector 3 detects an idle state, it disables the receive counter 110 to stop the receive count value, and informs the state machine 4 of this idle line state.

Thus, the counters 110 and 111 stop counting their clock to supply their outputs to the comparator 112. The receive and transmit count values are compared with each other and their relative values are determined to produce a comparator output. The comparator output is supplied to the state machine 4. If the comparator output of a given node indicates that the transmit counter 111 has attained a smaller value than that of receive counter 110, the state machine 4 of this node is the first to assert a Child_Notify request again. If the comparator output indicates otherwise (i.e., the output of transmit counter 111 is smaller than that of receive counter 110), the state machine 4 of this node may assert a Parent_Notify state in response to the output of comparator 112 or in response to a Child_Notify indication from the line state detector 3.

Figure 15:
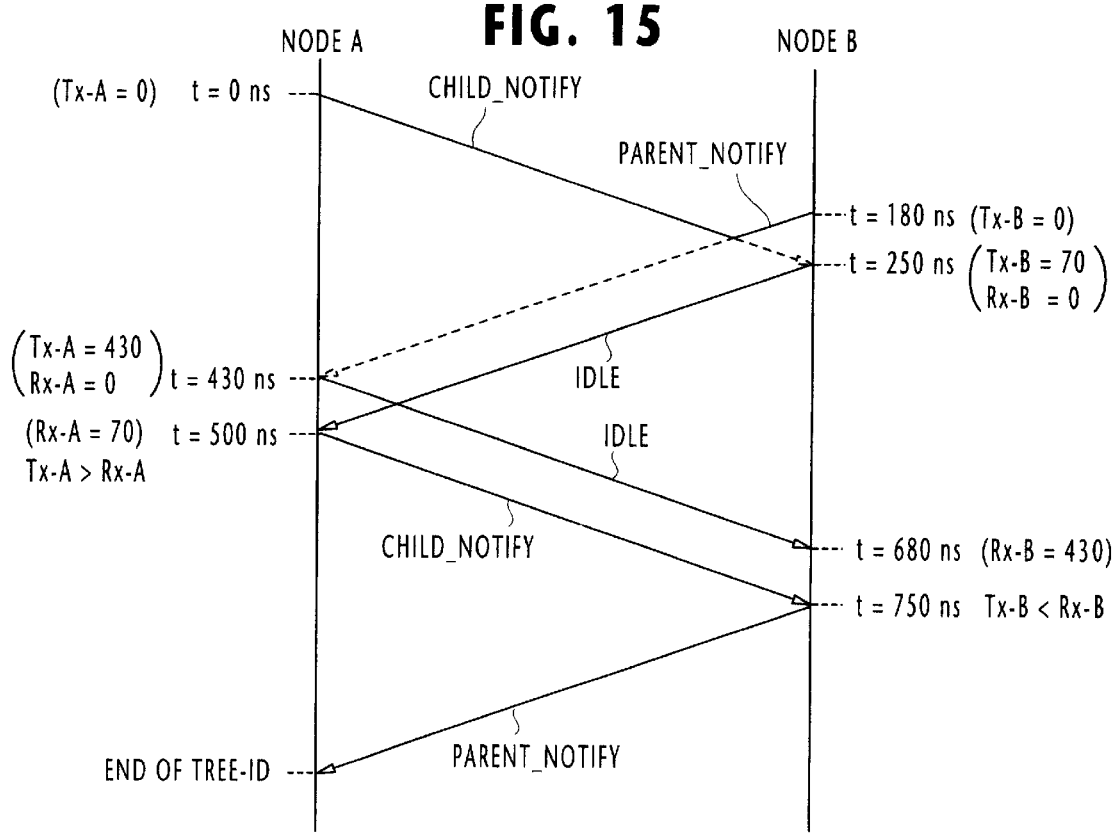
FIG. 15 is a time sequence diagram of the handshaking circuits of FIG. 14 during a tree identify process between two contending nodes.

The time sequence diagram shown in FIG. 15 illustrates the operation of the handshaking circuit of FIG. 14 when a root contention arises on a serial bus with a propagation delay of 250 ns between nodes A and B which are leaf and branch nodes, respectively.

When the state machine 4 of node A recognizes that the line state detector 3 is detecting that the input line is in an idle state, it changes its output line to Parent_Notify state at time t=0 ns, and enables its transmit counter 111 to start incrementing its count from the initial value (Tx-A=0).

Meanwhile, at node B, the state machine 4 has changed its output line from idle to Parent_Notify state at time t=180 ns and has enabled its transmit counter 11 to start incrementing its count from the initial value (Tx-B=0).

At time t=250 ns, the line state detector 3 of node B detects a root contention, notifies the state machine 4 of this fact, enables the receive counter 110 to start incrementing the receive count from the initial value (Rx-B=0) and disables the transmit counter 11 so that a transmit count value Tx-B=70 is obtained. State machine 4 of node B thus relinquishes the Parent_Notify request and the line state changes to idle.

At time t=430 ns, the line state detector 3 of node A detects the root contention, notifies the state machine 4 of this fact, enables the receive counter 110 to start incrementing its count from the initial value (Rx-A=0) and disables the transmit counter 111 so that a transmit count value of Tx-A=430 is obtained. State machine 4 of node A thus relinquishes the Parent_Notify request and the line state changes to idle.

At time t=500 ns, the line state detector 3 of node A senses that its input line has changed to idle state, notifies the state machine 4 of this fact and disables the receive counter 110, producing a receive count value of Rx-A=70. Since Tx-A is greater than Rx-A and since node A is currently detecting idle state, it is entitled to assert a Parent_Notify request again.

At time t=680 ns, the receive counter 110 of node B is disabled, producing a receive count value of Rx-B=430. Since, Tx-B is smaller than Rx-B, the state machine 4 of node B asserts a Child_Notify response when it is informed, at time t=750 ns, that the state of the serial bus has changed from idle to Parent_Notify.

As a result, a contention between nodes A and B is resolved and a parent-child relationship is established, regardless of the length of the serial bus, and node A recognizes itself as the parent of branch node B and branch node B as a child of leaf node A.

Figure 16:
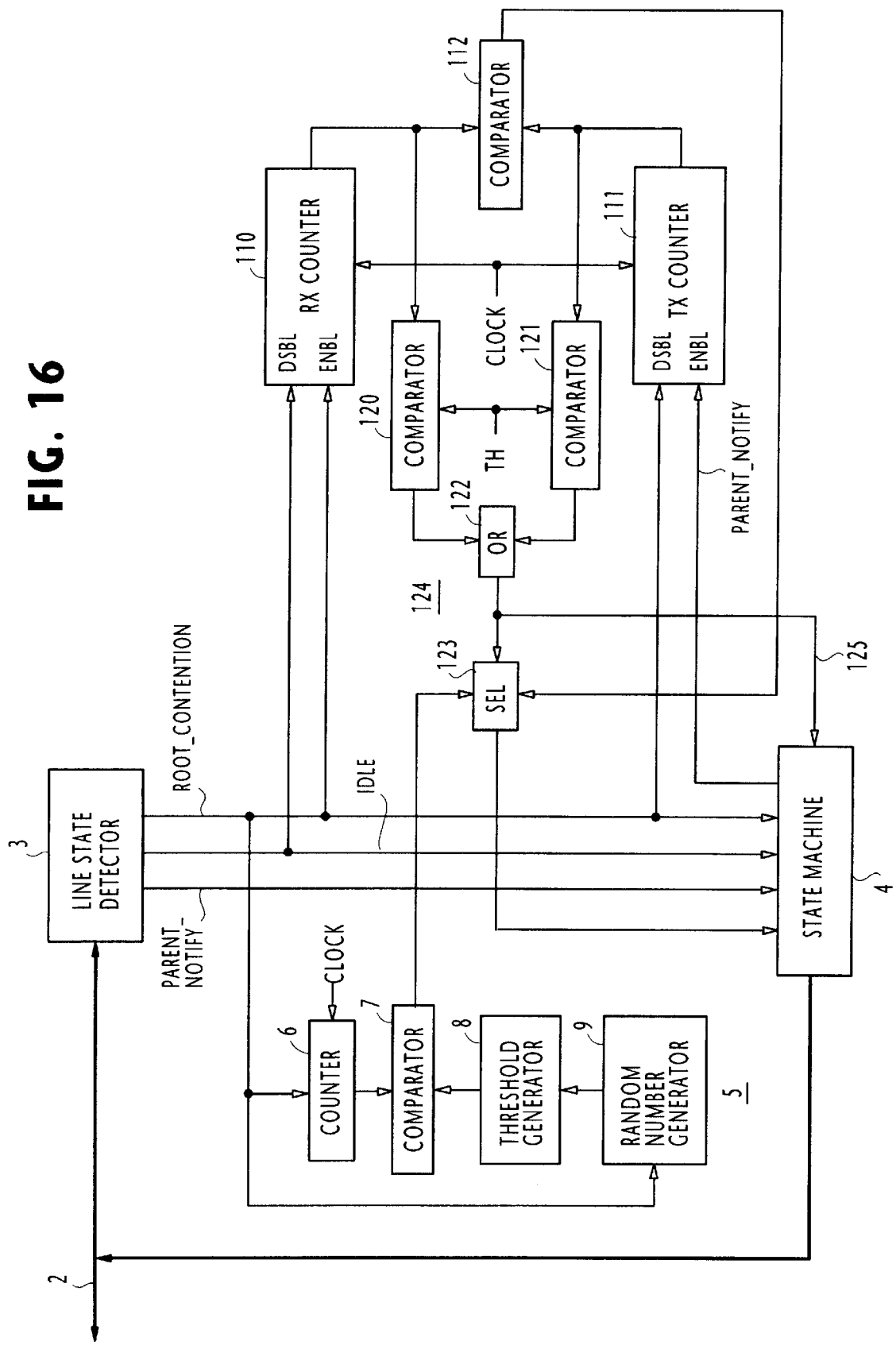
FIG. 16 is a block diagram of a modification of the embodiment of FIG. 6.

FIG. 16 shows a modified embodiment of FIG. 6, in which comparators 120 and 121 are connected to the outputs of receive and transmit counters 110 and 111, respectively, for comparison with a timeout threshold value representing a delay time of 100 ns, for example, which is twice the round-trip propagation delay (50 ns) of a bus length 4.5 meters. When one of the receive and transmit counters 110 and 111 exceeds the timeout threshold value, the corresponding one of comparators 120 and 121 produces a binary 1 at the corresponding input of an OR gate 122. Thus, when both counters do not exceed the threshold value both comparators 120 and 121 produce a binary 0 and hence the output of OR gate 122 is at binary 0. The output of OR gate 122 is connected to a selector 123, to which the output comparators 7 and 112 are also connected.

When the output of OR gate 122 is a binary 0, the selector 123 selects and couples the output of comparator 7 to the state machine 4. When the output of OR gate 122 is a binary 1, the selector 123 selects and couples the output of comparator 112 to the state machine 4. State machine 4 is supplied with the output of OR gate 122 via a line 125 to indicate in which mode the state machine is to be operated.

When either of the receive and transmit counters do not exceeds the threshold of 100 ns (thus, the output of OR gate is binary 0) and the comparator 7 produces a timeout signal, the state machine 4 is signaled by the output of OR gate 122 via line 125 that it should respond to the output of comparator 7 for operating in the random timer mode of FIG. 2. When one of the receive and transmit counters exceeds the threshold of 100 ns (thus, the output of OR gate is binary 1) and the comparator 112 produces an output indicating which of the receive and transmit counters is greater, the state machine 4 is signaled by the output of OR gate 122 via line 125 that it should respond to the output of comparator 112 for operating in the counter mode of FIG. 14.

In summary, the elements 120, 121, 122 and 123 constitute a decision circuit 124 that supplies the state machine 4 with a first decision output to allow it to operate in the random time mode when the transmit and receive count values are both greater than the 100-ns threshold and with a second decision output to allow it to operate in the counter mode when one of the transmit and receive count values is smaller than the threshold. State machine 4 responds to the first decision output for asserting the Parent_Notify state on the serial bus if the random period timer 5 expires during the presence of idle on the serial bus and asserting the Child_Notify state if the random period timer 5 expires during the presence of the Parent_Notify state. State machine 4 responds to the second decision output for asserting the Parent_Notify state when the transmit count value is smaller than the receive count value and asserting the Child_Notify state when the transmit count value is greater than the receive count value.

Figure 17:
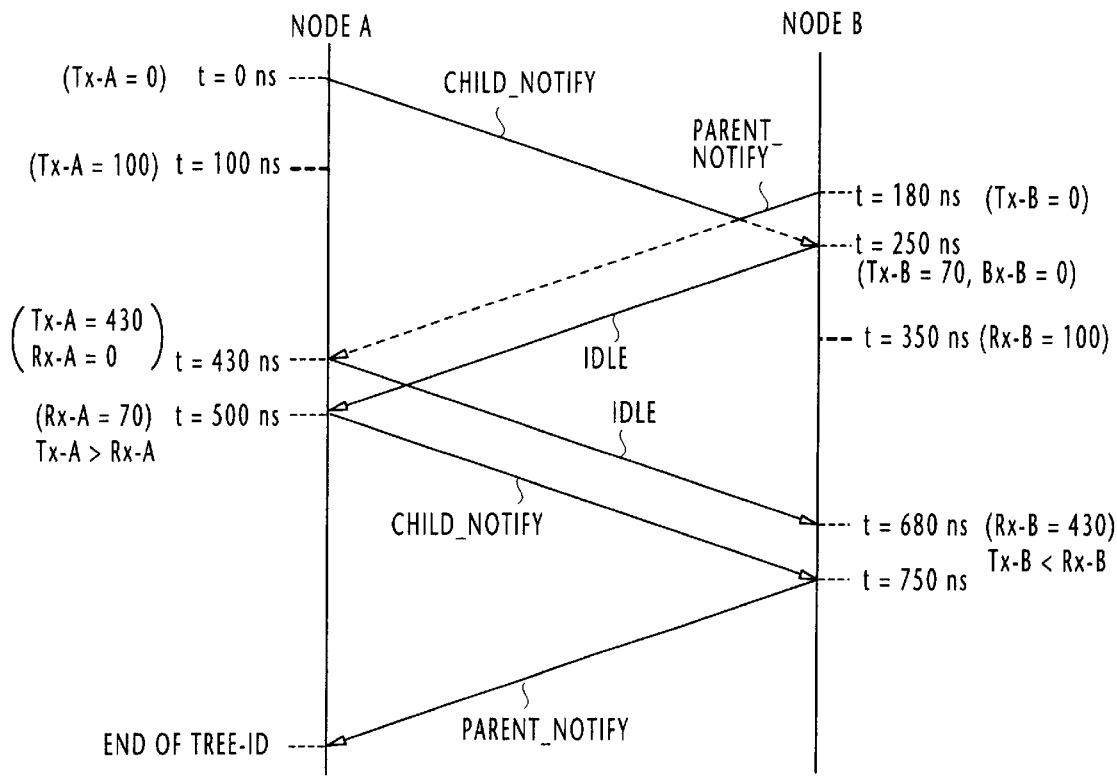
FIG. 17 is a time sequence diagram of the handshaking circuits of FIG. 16 during a tree identify process between two contending nodes.

As illustrated in FIG. 17, if node B asserts Child_Notify state 180 ns after node A initially asserted Child_Notify in a manner similar to FIG. 15, a contention occurs. If the serial bus 2 is 50 meters long (corresponding to a single-trip propagation delay of 250 ns), the receive counter 110 of node B reaches the threshold value of the comparator 120 at time t=350 ns, which, as described above, corresponds to the point of determination for node B between the random time mode and the counter mode, as illustrated in FIG. 17.

Since the transmit counter 111 of node A has already exceeded the threshold value of comparator 121 when its line state detector 3 detects the contention at time t=430 ns, and the transmit counter 111 of node B has already exceeded the threshold value of comparator 121 when its line state detector 3 detects the idle state at time t=680 ns, nodes A and B operate in the random time mode to resolve the contention in a manner similar to FIG. 15. It is seen that if the round-trip propagation delay of the serial bus is 40 ns, for example, the handshaking circuit operates in the counter mode to resolve the contention as shown in FIG. 13A.

Figure 18:
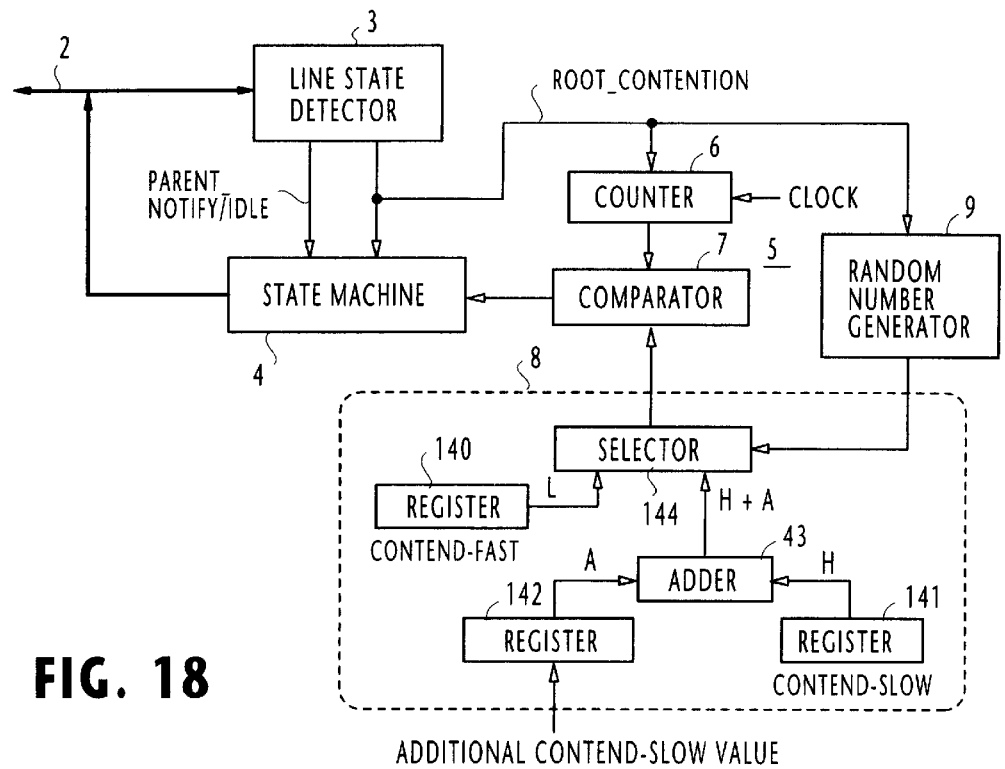
FIG. 18 is a block diagram of a modification of FIG. 8.

FIG. 18 shows another embodiment of the handshaking circuit in which the prior art threshold generator 8 of FIG. 2 is modified so that it comprises a register 140 for holding a fixed lower threshold value corresponding to the Contend_Fast time of 260 ns, a register 141 for holding a fixed higher threshold value corresponding to the Contend_Slow time of 600 ns, and a register 142 for storing a variable threshold value as an additional Contend_Slow timer value. An adder 143 is provided for summing the contents of registers 141 and 142. One of the outputs of adder 143 and register 140 is selected by a selector 144 according to the output of random number generator 9. The output of selector 144 is supplied as a random threshold value to the comparator 7. The fixed value of register 141 corresponds to the nominal length of the serial bus. The value of register 142 is manually set so that it corresponds to the distance by which the length of the serial bus exceeds the nominal bus length.

If the additional threshold value of register 142 corresponds to a delay time of 180 ns and the serial bus has a length of 150 meters (where the round-trip propagation delay is approximately 500 ns), the line state detector 3 of node B detects Parent_Notify state within the extended time window of 180 ns, as shown in FIG. 19, provided that the same random numbers are adopted by nodes A and B as those in FIG. 13B. As a result, node B asserts Child_Notify state when its line state detector 3 senses a Parent_Notify state at time t=1030 ns. Root contention on a serial bus longer than the nominal value can be resolved by adjusting the value of register 142.

FIG. 20 is a block diagram illustrating another embodiment of this invention in which repeaters 150 and 151 (FIG. 21) are provided at the opposite end of the serial bus 2 and used in combination of handshaking circuits (FIG. 22) of nodes 152 and 153.

As shown in detail in FIG. 21, each repeater includes a format converter 160 interposed between the serial bus 2 with which it is connected to the handshaking circuit of the local node and a cable 154 with it is connected to a remote repeater. Converter 160 performs conversion between the IEEE 1394 standard format on the serial bus 2 and the usual bipolar format on the cable 154.

A Root_Contention detector 161 is provided for detecting a root contention on the serial bus 2 to produce a contention presence signal. Idle detectors 162 and 164 are connected to the serial bus 2 and the high-speed cable 154, respectively, to detect an idle state and produce an output when they are enabled by the contention presence signal. A root contention notify circuit 163 is provided to respond to the output of idle detector 162 for setting the serial bus 2 at Root_Contention_Notify state for the purpose of locking the handshaking circuit of the local node in an inactive state. At the same time, the notify circuit 163 supplies a disable signal via an OR gate 171 to the converter 160 to prevent it from passing the signal from the remote repeater to the local node when the RC notify circuit 163 is supplying a signal to the local node, instead of the signal from the remote repeater. The output of root contention detector 161 is also applied as a disable signal via the OR gate 171 to the converter 160 to prevent it from passing the remote signal to the local node when a root contention is detected.

A Parent_Notify detector 165 is connected to the input line of cable 154 to disable the RC notify circuit 163 when the line state changes to Parent_Notify after the detector 165 is 19 enabled by the output of idle detector 164.

Counter 166 starts incrementing a clock count in response to the contention presence signal from detector 161. Random number generator 169 is also responsive to the contention presence signal to produce a random number of either 1 or 0. Threshold generator 168 produces a lower threshold value corresponding to 260 ns (Contend_Fast). According to this embodiment, this threshold generator has a higher threshold value corresponding to 780 ns (Contend_Slow) which is larger than the higher random threshold value specified by the IEEE 1394 standard. Depending on the output of random number generator 169, the threshold generator 168 selects one of the threshold values. Comparator 167 produces an output indicating the value of the clock count relative to the threshold value and disables the state machine 163 when the clock count exceeds the threshold value. Elements 166 to 169 thus constitute a random period timer 170.

Figure 22:
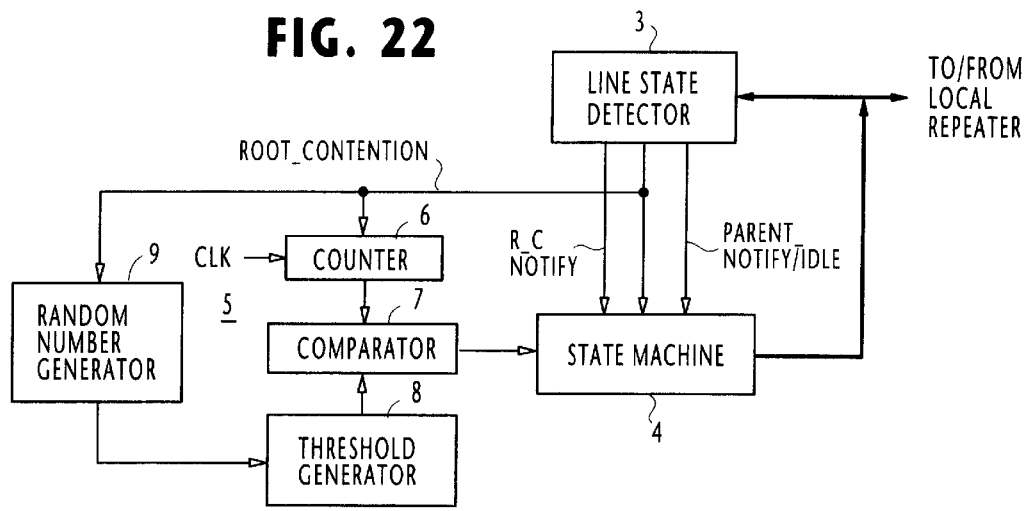
FIG. 22 is a block diagram of each handshaking circuit of FIG. 20.

FIG. 22 shows the handshaking circuit used by the nodes 152 and 153. As illustrated, this handshaking circuit is similar to that shown in FIG. 2 except that the line state detector 3 responds to the Root_Contention Notify state on the serial bus 2 from the local repeater for locking the state machine 4 so that it is prevented from responding to a state indication signal from the line state detector 3 at the time the random period timer 5 expires.

Figure 23:
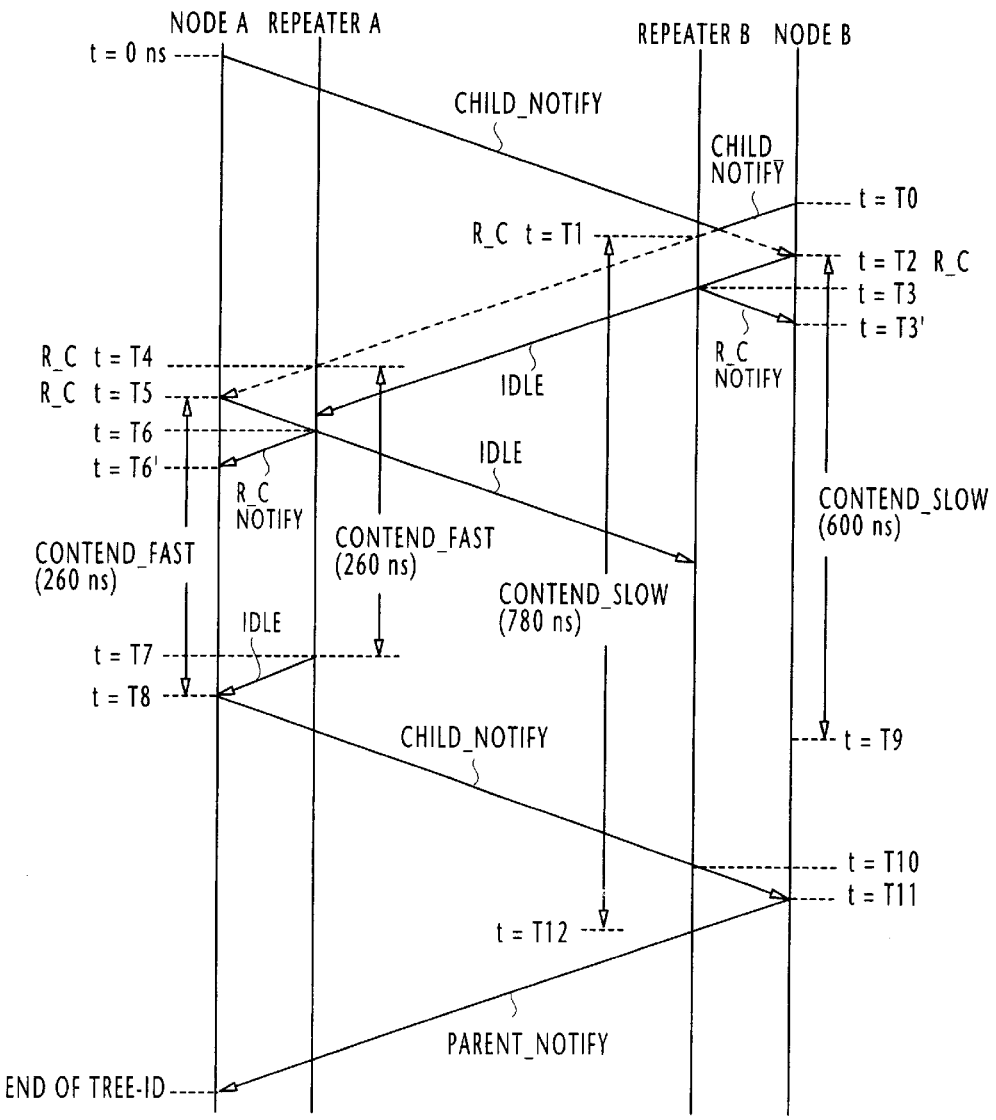
FIG. 23 is a time sequence diagram of a tree identify process of the repeaters of FIG. 21 and the prior art handshaking circuits of FIG. 22.

The following is a description of the root contention resolution procedure of the repeaters and handshaking circuits of FIGS. 21 and 22 with the aid of the time sequence diagram of FIG. 23 by assuming that node A and repeater A determine a period of 260 ns, repeater B determines a period of 780 ns and node B determines a period of 600 ns.

At time t=0, node A (leaf node) asserts Parent_Notify state, which is converted by repeaters A and B and detected by node B at time T2 as a root contention since node B has already asserted Parent_Notify at time T0. Thus, repeater B detects a root contention at time T1 and starts its counter 166 and node B changes the local serial bus 2 to an idle state at time T2 and enables its counter 6. Repeater B changes the local serial bus 2 to Root_Contention_Notify state (instead of the corrupted Parent_Notify state) at time T3 when its idle detector 162 senses the idle state on the serial bus 2.

At time T4, the Parent Notify state asserted at T0 is sensed by repeater A as a root contention, and relayed to node A, which also senses it at time T5 as a root contention and relinquishes the Parent_Notify state and sets the serial bus to an idle state, while starting its counter 6. Repeater A detects this idle state at time T6 and changes the input line of node A to Root_Contention_Notify state (instead of the corrupted Parent_Notify state).

At time T7, the counter 166 of repeater A reaches the random period of 260 ns, causing the contention notify circuit 163 to relinquish the R_C_Notify state, thus setting the serial bus to idle. At time T8, the counter 6 of node A reaches the Contend_Fast period of 260 ns.

Due to the occurrence of the idle state at its input line at time T8, node A, which has been locked from time T6', is now unlocked and asserts a Parent_Notify state again as the parent of node B.

At time T9, the counter 6 of node B reaches the Contend_Slow period of 600 ns. Since node B has been in a locked state from time T3' due to the presence of the R_C_Notify state, its state machine 4 does not change its Parent_Notify state although its Contend_Slow period already expired at time T9.

At time T10, the Parent_Notify detector 165 of repeater B detects the Child_Notify state and disables the contention notify circuit 163 so that the serial bus 2 of node B changes from R_C_Notify to Parent_Notify state, which the node B senses at time T11. Thus, node B responds to this Parent_Notify state and asserts a Parent_Notify state as a parent of node A. At time T12, the Contend_Slow period of repeater B expires when its counter 166 reaches the timeout threshold of 780 ns.

What is claimed is:

1. A handshaking circuit for establishing a particular relationship between nodes interconnected by a transmission medium, comprising:
   a state detector for monitoring said transmission medium to detect a predetermined first state, a predetermined second state, a contention when said predetermined first and second states are simultaneously asserted on said transmission medium, and an idle state when either of said first and second states is not asserted on the transmission medium;
   a state machine connected to the state detector for asserting the first state on said transmission medium to initiate a handshaking process and relinquishing the first state when the contention is detected by the state detector;
   a receive counter connected to the state detector for continuously incrementing a receive count value from the instant the contention is detected to the instant said idle state is detected;
   a transmit counter connected to the state detector and the state machine for continuously incrementing a transmit count value from the instant the first state is detected to the instant the contention is detected; and
   a comparator for comparing the receive count value with the transmit count value,
   said state machine asserting the first state on the transmission medium again when the transmit count value is greater than the receive count value and asserting said second state on the transmission medium when the transmit count value is smaller than the receive count value.

2. A handshaking circuit as claimed in claim 1, wherein said state machine is arranged to assert the second state on the transmission medium at the instant the first state is detected again by the state detector.

3. A handshaking circuit for establishing a particular relationship between nodes interconnected by a transmission medium, comprising:
   a state detector for monitoring said transmission medium to detect a predetermined first state, a predetermined second state, a contention when said predetermined first and second states are simultaneously asserted on said transmission medium, and an idle state when either of said first and second states is not asserted on said transmission medium;
   a state machine connected to the state detector for asserting the first state on the transmission medium to initiate a handshaking process and relinquishing the first state when the contention is detected by the state detector;
   a receive counter connected to the state detector for continuously incrementing a receive count value from the instant the contention is detected to the instant said idle state is detected;
   a transmit counter connected to the state detector and the state machine for continuously incrementing a transmit count value from the instant the first state is detected to the instant said contention is detected;
   a comparator for comparing the receive count value with the transmit count value,
   decision means for producing a first decision output when the transmit and receive count values are lower than a predefined threshold and a second decision output when one of said transmit and receive count values is greater than the predefined threshold; and
   a random period timer arranged to be activated in response to the detection of the contention by the state detector;
   wherein said state machine is arranged to:
      respond to the first decision output for asserting the first state on the transmission medium if the random period timer expires during the absence of the first and second states on the transmission medium and asserting the second state on the transmission medium if the random period timer expires during the presence of the first state on the transmission medium; and
      respond to the second decision output for asserting the first state on the transmission medium when the transmit count value is greater than the receive count value and asserting the second state on the transmission medium when the transmit count value is smaller than the receive count value.

4. A handshaking circuit for establishing a particular relationship between nodes interconnected by a transmission medium, comprising:
   a random number generator for producing a random number;
   a threshold generator having a first threshold value, a second threshold value, an adjustable value, means for summing the second threshold value and the adjustable value to produce a summed threshold value greater than the first threshold value, and means for selecting of the first threshold value and the summed threshold value depending on said random number;
   a state detector for detecting predetermined first and second states and a contention between said nodes on the transmission medium;
   a counter for continuously incrementing a clock count in response to the detection of the contention by the state detector;
   a comparator for comparing the clock count of the counter with the selected threshold value and producing an output when the clock count equals the selected threshold value; and
   a state machine connected to the state detector for asserting the first state on the transmission medium to initiate a handshaking process and relinquishing the first state when the contention is detected, and asserting the first state on the transmission medium again if the comparator produces said output during the absence of the first and second states on the transmission medium and asserting the second state on the transmission medium if the comparator produces said output during the presence of the first state on the transmission medium.

5. A communication system comprising a handshaking circuit connected through a repeater to a remote site via a transmission medium:
   the handshaking circuit comprising:
      a state detector for monitoring said transmission medium to detect a predetermined first state, a predetermined second state, an idle state and a contention when said predetermined first and second states are simultaneously asserted on said transmission medium; and a random period timer responsive to the detection of the contention by the state detector for continuously incrementing a clock count value;

a state machine connected to the state detector for asserting the first state on the transmission medium to initiate a handshaking process and relinquishing the first state when the contention is detected, asserting the first state on the transmission medium again if the random period timer expires during the absence of the first or second state on the transmission medium and asserting said second state on the transmission medium if the random period timer expires during the presence of the first state on the transmission medium, the repeater comprising:

a two-way format converter connected in said transmission medium so that the transmission medium is divided into a local side and a remote side;

a contention detector for detecting a contention on the local side of said transmission medium;

a first idle detector responsive to the detection of the contention for detecting the idle state on the local side of the transmission medium;

notification means responsive to the detection of the idle state by the first idle detector for asserting a third state on the local side of the transmission medium and disabling said converter;

a second idle detector responsive to the detection of said contention for detecting the idle state on the remote side of the transmission medium;

a state detector responsive to the detection of the idle state by the second idle detector for monitoring the remote side of the transmission medium for disabling the notification means when the first state is detected on the remote side of the transmission medium; and a random period timer for disabling the notification means when a random interval from the time of detection of said contention expires, the state detector of the handshaking circuit being arranged to detect the third state on the local side of the transmission medium, the state machine of the handshaking circuit being arranged to be disabled in response to the detection of the third state so that the state machine is prevented from responding to the expiration of said random period timer of the handshaking circuit as long as the third state is detected on the local side of the transmission medium.

6. A method for resolving a contention that occurs on a transmission medium between two network nodes, using transmit and receive counters, the method comprising:

a) monitoring said transmission medium to detect a predetermined first state, a predetermined second state, an idle state when either of said predetermined first and second states is not present on the transmission medium, and a contention between said network nodes when said predetermined first and second states are simultaneously present on the transmission medium;

b) asserting the first state on said transmission medium to initiate a handshaking process and enabling the transmit counter to start incrementing a transmit count value;

c) when said contention is detected, relinquishing the first state, disabling the transmit counter to stop incrementing the transmit count value and enabling the receive counter to start incrementing a receive count value;

d) disabling the receive counter to stop incrementing the receive count value when the idle state is detected;

e) comparing the receive count value with the transmit count value; and f) asserting the first state on the transmission medium again when the transmit count value is greater than the receive count value and asserting the second state on the transmission medium when the transmit count value is smaller than the receive count value.

7. The method of claim 6, wherein the step (g) comprises asserting said second state on the transmission medium at the instant the first state is detected again on the transmission medium.

8. A method determining status of first and second nodes interconnected by a transmission medium, comprising the steps of:

a) transmitting, from said first and second nodes, first and second request signals, respectively, to said transmission medium for asserting a first state and second state; and b) setting said first and second nodes in said first and second states, respectively, depending on the time of transmission of the first request signal relative to the time of transmission of the second request signal.

9. The method of claim 8, wherein said first and second states correspond to the parent and child states, respectively, defined by the IEEE 1394 standard.

10. The method of claim 9, wherein the step (b) comprises setting said first and second nodes in said parent and child states, respectively, if the time of transmission of the first request signal is later than the time of transmission of the second request signal.

11. A method of determining status of local and remote nodes interconnected by a transmission medium, comprising the steps of:

a) transmitting, from the local node, a first request signal to the transmission medium for asserting a first state;

b) causing a transmit counter in said local node to start incrementing a count value thereof in response to the transmission of said first request signal;

c) canceling said first request signal if a contention occurs on said transmission medium between the first request signal and a second request signal transmitted from said remote node, causing said transmit counter to stop incrementing the count value thereof, and causing a receive counter in said local node to start increment a count value thereof; and d) causing said receive counter to stop incrementing the count value thereof when an idle state is detected on said transmission medium and setting said local node in said first state or in a second state depending on the count value of said transmit counter relative to the count value of the receive counter.

12. The method of claim 11, wherein said first and second states correspond to the parent and child states, respectively, defined by the IEEE 1394 standard.

13. The method of claim 12, wherein the step (d) comprises setting said local and remote nodes in the parent and child states, respectively, if the count value of the transmit counter is smaller than the count value of the receive counter, and setting said local and remote nodes in the child and parent states, respectively, if the count value of the transmit counter is greater than the count value of the receive counter.

14. A method of determining status of local and remote nodes interconnected by a transmission medium, comprising the steps of:

a) transmitting, from the local node, a first request signal to the transmission medium for asserting a parent state defined by the IEEE 1394 standard;

b) causing a transmit counter in said local node to start incrementing a count value thereof in response to the transmission of said first request signal;

c) canceling said first request signal if a contention occurs on said transmission medium between the first request signal and a second request signal transmitted from said remote node, causing said transmit counter to stop incrementing the count value thereof, and causing a receive counter in said local node to start incrementing a count value thereof; and d) causing said receive counter to stop incrementing the count value thereof when an idle state is detected on said transmission medium and setting said local and remote nodes in said parent and child states, respectively, defined by the IEEE 1394 standard, if the count value of the transmit counter is greater than the count value of the receive counter, and setting said local and remote nodes in said child and parent states, respectively, if the count value of the transmit counter is smaller than the count value of the receive counter.

15. A handshaking circuit for establishing a particular relationship between nodes interconnected by a transmission medium, comprising:

a state detector for monitoring said transmission medium to detect child and parent states defined by the IEEE 1394 standard, a contention when said child and parent states are simultaneously asserted on said transmission medium, and an idle state when either of said child and parent states is not asserted on the transmission medium;

a state machine connected to the state detector for asserting the child state on said transmission medium to initiate a handshaking process and relinquishing the child state when the contention is detected by the state detector;

a receive counter connected to the state detector for continuously incrementing a receive count value from the instant the contention is detected to the instant said idle state is detected;

a transmit counter connected to the state detector and the state machine for continuously incrementing a transmit count value from the instant the child state is detected to the instant the contention is detected; and a comparator for comparing the receive count value with the transmit count value, said state machine asserting the child state on the transmission medium again when the transmit count value is smaller than the receive count value and asserting said parent state on the transmission medium when the transmit count value is greater than the receive count value.

16. A handshaking circuit as claimed in claim 15, wherein said state machine is arranged to assert the parent state on the transmission medium at the instant the child state is detected again by the state detector.

17. A handshaking circuit for establishing a particular relationship between nodes interconnected by a transmission medium, comprising:

a state detector for monitoring said transmission medium to detect child and parent defined by the IEEE 1394 standard, and a contention when the child and parent states are simultaneously asserted on said transmission medium, and an idle state when either of said parent and child states is not asserted on said transmission medium;

a state machine connected to the state detector for asserting the child state on the transmission medium to initiate a handshaking process and relinquishing the child state when the contention is detected by the state detector;

a receive counter connected to the state detector for continuously incrementing a receive count value from the instant the contention is detected to the instant said idle state is detected;

a transmit counter connected to the state detector and the state machine for continuously incrementing a transmit count value from the instant the child state is detected to the instant said contention is detected;

a comparator for comparing the receive count value with the transmit count value, decision means for producing a first decision output when the transmit and receive count values are greater than a predefined threshold and a second decision output when one of said transmit and receive count values is lower than the predefined threshold; and a random period timer arranged to be activated in response to the detection of the contention by the state detector;

wherein said state machine is arranged to:

respond to the first decision output for asserting the child state on the transmission medium if the random period timer expires during the absence of the child and parent states on the transmission medium and asserting the parent state on the transmission medium if the random period timer expires during the presence of the child state on the transmission medium; and respond to the second decision output for asserting the child state on the transmission medium when the transmit count value is smaller than the receive count value and asserting the present state on the transmission medium when the transmit count value is greater than the receive count value.

18. A method for resolving a contention that occurs on a transmission medium between two network nodes, using transmit and receive counters, the method comprising:

a) monitoring said transmission medium to detect child and parent states defined by the IEEE 1394 standard, an idle state when either of said child and parent states is not present on the transmission and contention between said network nodes when the child and parent are simultaneously present on the transmission medium;

b) asserting the child state on said transmission medium to initiate a handshaking process and enabling the transmit counter to start incrementing a transmit count value;

c) when said contention is detected, relinquishing the child state, disabling the transmit counter to stop incrementing the transmit count value and enabling the receive counter to start incrementing a receive count value;

d) disabling the receive counter to stop incrementing the receive count value when the idle state is detected;

e) comparing the receive count value with the transmit count value; and f) asserting the child state on the transmission medium again when the transmit count value is smaller than the receive count value and asserting the parent state on the transmission medium when the transmit count value is greater than the receive count value.

19. The method of claim 18, wherein the step (g) comprises asserting,said parent state on the transmission medium at the instant the child state is detected again on the transmission medium.

* * * * *